US012549696B2

(12) United States Patent
Ooguni et al.

(10) Patent No.: US 12,549,696 B2
(45) Date of Patent: Feb. 10, 2026

(54) INSTALLATION SUPPORT APPARATUS, INSTALLATION SUPPORT METHOD, AND INSTALLATION SUPPORT PROGRAM

(71) Applicant: FUJIFILM Corporation, Tokyo (JP)

(72) Inventors: Toshihiro Ooguni, Saitama (JP); Kazuyuki Itagaki, Saitama (JP); Kenshi Imamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 441 days.

(21) Appl. No.: 18/340,140

(22) Filed: Jun. 23, 2023

(65) Prior Publication Data

US 2023/0336698 A1 Oct. 19, 2023

Related U.S. Application Data

(63) Continuation of application No. PCT/JP2021/045568, filed on Dec. 10, 2021.

(30) Foreign Application Priority Data

Dec. 25, 2020 (JP) ................................. 2020-217618

(51) Int. Cl.
*H04N 9/31* (2006.01)
*G03B 21/14* (2006.01)

(52) U.S. Cl.
CPC ......... *H04N 9/3194* (2013.01); *G03B 21/142* (2013.01); *H04N 9/3185* (2013.01)

(58) Field of Classification Search
CPC ...... G03B 21/00; G03B 21/14; G03B 21/142; G03B 21/145; G03B 21/208;

(Continued)

(56) References Cited

U.S. PATENT DOCUMENTS

2018/0014008 A1* 1/2018 Sugiura ................ G03B 21/142
2018/0352205 A1* 12/2018 Kotani ................ H04N 9/3182

(Continued)

FOREIGN PATENT DOCUMENTS

| JP | 2003-295309 A | 10/2003 |
| JP | 2005-151310 A | 6/2005 |

(Continued)

OTHER PUBLICATIONS

International Preliminary Report on Patentability and English translation of the Written Opinion of the International Searching Authority for International Application No. PCT/JP2021/045568, dated Jul. 6, 2023.

(Continued)

*Primary Examiner* — Sultan Chowdhury
(74) *Attorney, Agent, or Firm* — Birch, Stewart, Kolasch & Birch, LLP

(57) ABSTRACT

An installation support apparatus supports installation of a projection apparatus, and includes a processor, and the processor is configured to: based on an input of a projection range of the projection apparatus in a space in which projection is performed by the projection apparatus, calculate an installation range in which the projection apparatus is installable in the space; and output an installation support image obtained by superimposing an image showing the calculated installation range on an image showing the space.

19 Claims, 23 Drawing Sheets

(58) Field of Classification Search
CPC .. H04N 9/3141; H04N 9/3147; H04N 9/3185; H04N 9/3188; H04N 9/3194; G09G 5/00; G09G 5/001; G09G 5/24; G09G 5/30; G09G 5/36; G09G 5/377; G09G 2354/00; G09G 2340/045; G09G 3/002
See application file for complete search history.

(56) References Cited

U.S. PATENT DOCUMENTS

| | | |
|---|---|---|
| 2019/0116356 A1 | 4/2019 | Matoba et al. |
| 2021/0158730 A1* | 5/2021 | Kondo .................. G06F 18/241 |

FOREIGN PATENT DOCUMENTS

| | | |
|---|---|---|
| JP | 2005-311744 A | 11/2005 |
| JP | 2014-52393 A | 3/2014 |
| JP | 2015-50683 A | 3/2015 |
| WO | WO 2017/179272 A1 | 10/2017 |

OTHER PUBLICATIONS

International Search Report for International Application No. PCT/JP2021/045568, dated Feb. 15, 2022, with English translation.

\* cited by examiner

INSTALLATION SUPPORT APPARATUS, INSTALLATION SUPPORT METHOD, AND INSTALLATION SUPPORT PROGRAM

CROSS REFERENCE TO RELATED APPLICATION

This is a continuation of International Application No. PCT/JP2021/045568 filed on Dec. 10, 2021, and claims priority from Japanese Patent Application No. 2020-217618 filed on Dec. 25, 2020, the entire disclosure of which is incorporated herein by reference.

BACKGROUND OF THE INVENTION

1. Field of the Invention

The present invention relates to an installation support apparatus, an installation support method, and a computer readable medium storing an installation support program.

2. Description of the Related Art

JP2005-311744A discloses a configuration of detecting a position of a screen, determining relative positional information of a projection type display device with respect to the screen based on a detection result, and performing instruction display or the like for a user to guide the device to an installable range of the projection type display device.

SUMMARY OF THE INVENTION

One embodiment according to the disclosed technology provides an installation support apparatus, an installation support method, and a computer readable medium storing an installation support program that can facilitate installation of a projection apparatus.

An installation support apparatus according to an aspect of the present invention is an installation support apparatus that supports installation of a projection apparatus, the installation support apparatus comprising a processor, in which the processor is configured to, based on an input of a projection range of the projection apparatus in a space in which projection is performed by the projection apparatus, calculate an installation range in which the projection apparatus is installable in the space, and output an installation support image obtained by superimposing an image showing the calculated installation range on an image showing the space.

An installation support method according to another aspect of the present invention is an installation support method of supporting installation of a projection apparatus, the installation support method comprising, via a processor, calculating, based on an input of a projection range of the projection apparatus in a space in which projection is performed by the projection apparatus, an installation range in which the projection apparatus is installable in the space, and outputting an installation support image obtained by superimposing an image showing the calculated installation range on an image showing the space.

An installation support program, which is stored in a computer readable medium, according to still another aspect of the present invention is an installation support program for supporting installation of a projection apparatus, the installation support program causing a processor to execute a process comprising calculating, based on an input of a projection range of the projection apparatus in a space in which projection is performed by the projection apparatus, an installation range in which the projection apparatus is installable in the space, and outputting an installation support image obtained by superimposing an image showing the calculated installation range on an image showing the space.

Another installation support apparatus according to still another aspect of the present invention is an installation support apparatus that supports installation of a projection apparatus, the installation support apparatus comprising a processor, in which the processor is configured to, based on inputs of an installation position of the projection apparatus in a space in which projection is performed by the projection apparatus, and projection reference information, calculate a projection range of the projection apparatus in the space, and output an installation support image obtained by superimposing an image showing the calculated projection range on an image showing the space.

Another installation support method according to still another aspect of the present invention is an installation support method of supporting installation of a projection apparatus, the installation support method comprising, via a processor, calculating, based on inputs of an installation position of the projection apparatus in a space in which projection is performed by the projection apparatus, and projection reference information, a projection range of the projection apparatus in the space, and outputting an installation support image obtained by superimposing an image showing the calculated projection range on an image showing the space.

Another installation support program, which is stored in a computer readable medium, according to still another aspect of the present invention is an installation support program for supporting installation of a projection apparatus, the installation support program causing a processor to execute a process comprising calculating, based on inputs of an installation position of the projection apparatus in a space in which projection is performed by the projection apparatus, and projection reference information, a projection range of the projection apparatus in the space, and outputting an installation support image obtained by superimposing an image showing the calculated projection range on an image showing the space.

According to the present invention, an installation support apparatus, an installation support method, and a computer readable medium storing an installation support program that can facilitate installation of a projection apparatus can be provided.

DESCRIPTION OF THE PREFERRED EMBODIMENTS

Hereinafter, an example of embodiments of the present invention will be described with reference to the drawings.

Embodiment 1

<Schematic Configuration of Projection Apparatus 10 as Target to be Supported for Installation by Installation Support Apparatus of Embodiment 1>

Figure 1:
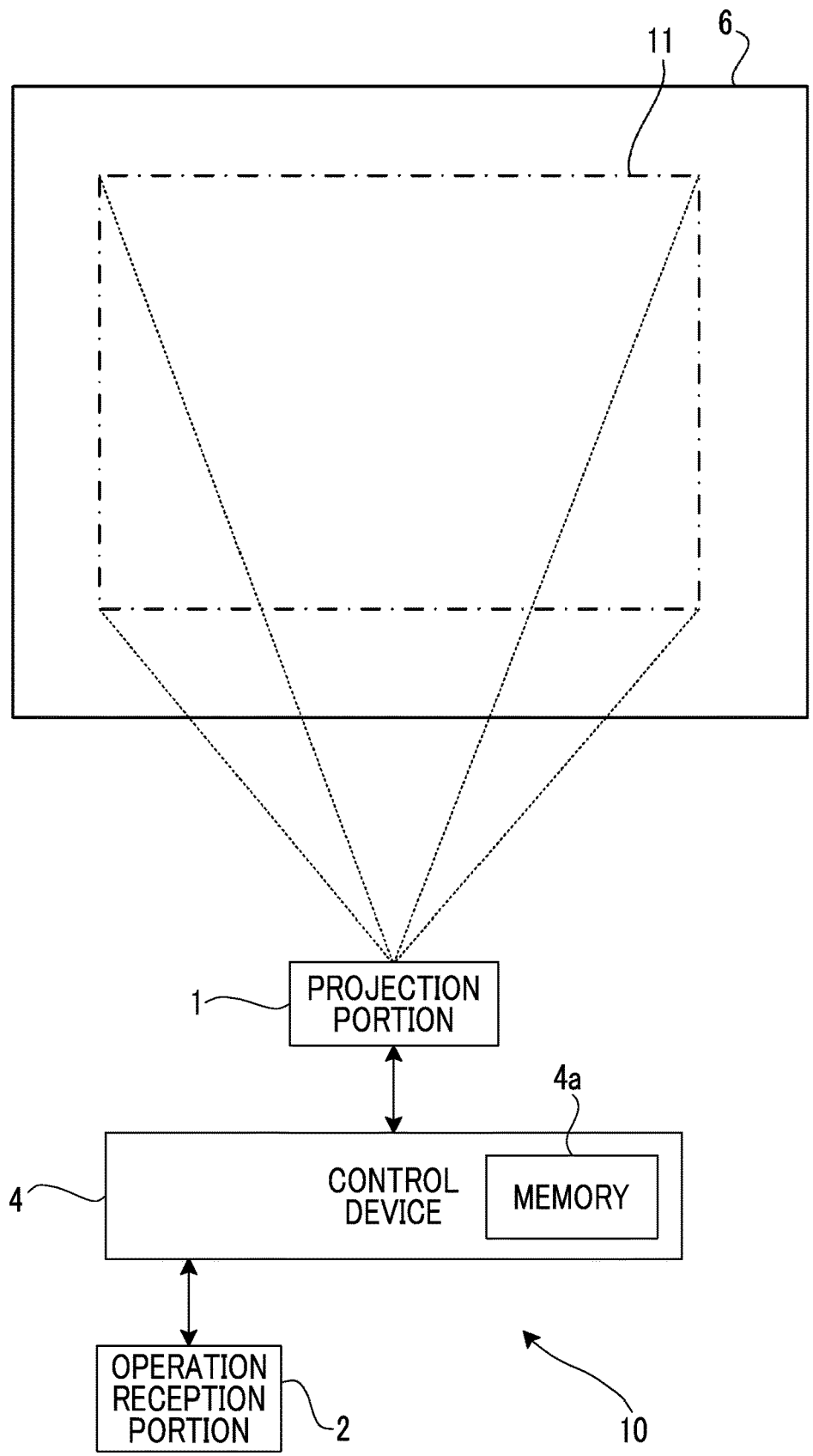
FIG. 1 is a schematic diagram illustrating a schematic configuration of a projection apparatus 10 as a target to be supported for installation by an installation support apparatus of Embodiment 1.

FIG. 1 is a schematic diagram illustrating a schematic configuration of a projection apparatus 10 as a target to be supported for installation by an installation support apparatus of Embodiment 1.

For example, the installation support apparatus of the embodiment can be used for supporting installation of the projection apparatus 10. The projection apparatus 10 comprises a projection portion 1, a control device 4, and an operation reception portion 2. The projection portion 1 is configured with, for example, a liquid crystal projector or with a projector using liquid crystal on silicon (LCOS). Hereinafter, the projection portion 1 will be described as a liquid crystal projector.

The control device 4 is a control device that controls projection performed by the projection apparatus 10. The control device 4 is a device including a control portion configured with various processors, a communication interface (not illustrated) for communicating with each portion, and a memory 4a such as a hard disk, a solid state drive (SSD), or a read only memory (ROM) and manages and controls the projection portion 1.

Examples of the various processors of the control portion of the control device 4 include a central processing unit (CPU) that is a general-purpose processor performing various types of processing by executing a program, a programmable logic device (PLD) such as a field programmable gate array (FPGA) that is a processor having a circuit configuration changeable after manufacture, or a dedicated electric circuit such as an application specific integrated circuit (ASIC) that is a processor having a circuit configuration dedicatedly designed to execute specific processing.

More specifically, a structure of these various processors is an electric circuit in which circuit elements such as semiconductor elements are combined. The control portion of the control device 4 may be configured with one of the various processors or may be configured with a combination of two or more processors of the same type or different types (for example, a combination of a plurality of FPGAs or a combination of a CPU and an FPGA).

The operation reception portion 2 detects an instruction from a user by receiving various operations from the user. The operation reception portion 2 may be a button, a key, a joystick, or the like provided in the control device 4 or may be a reception portion or the like that receives a signal from a remote controller for remotely operating the control device 4.

A projection object 6 is an object such as a screen or a wall having a projection surface on which a projection image is displayed by the projection portion 1. In the example illustrated in FIG. 1, in the projection object 6, the projection surface of the projection object 6 is a rectangular plane. It is assumed that upper, lower, left, and right sides of the projection object 6 in FIG. 1 are upper, lower, left, and right sides of the actual projection object 6.

A projection range 11 illustrated by a dot-dashed line is a region irradiated with projection light by the projection portion 1 in the projection object 6. In the example illustrated in FIG. 1, the projection range 11 is rectangular. The projection range 11 is a part or the entirety of a projectable range in which the projection can be performed by the projection portion 1.

Figure 3:
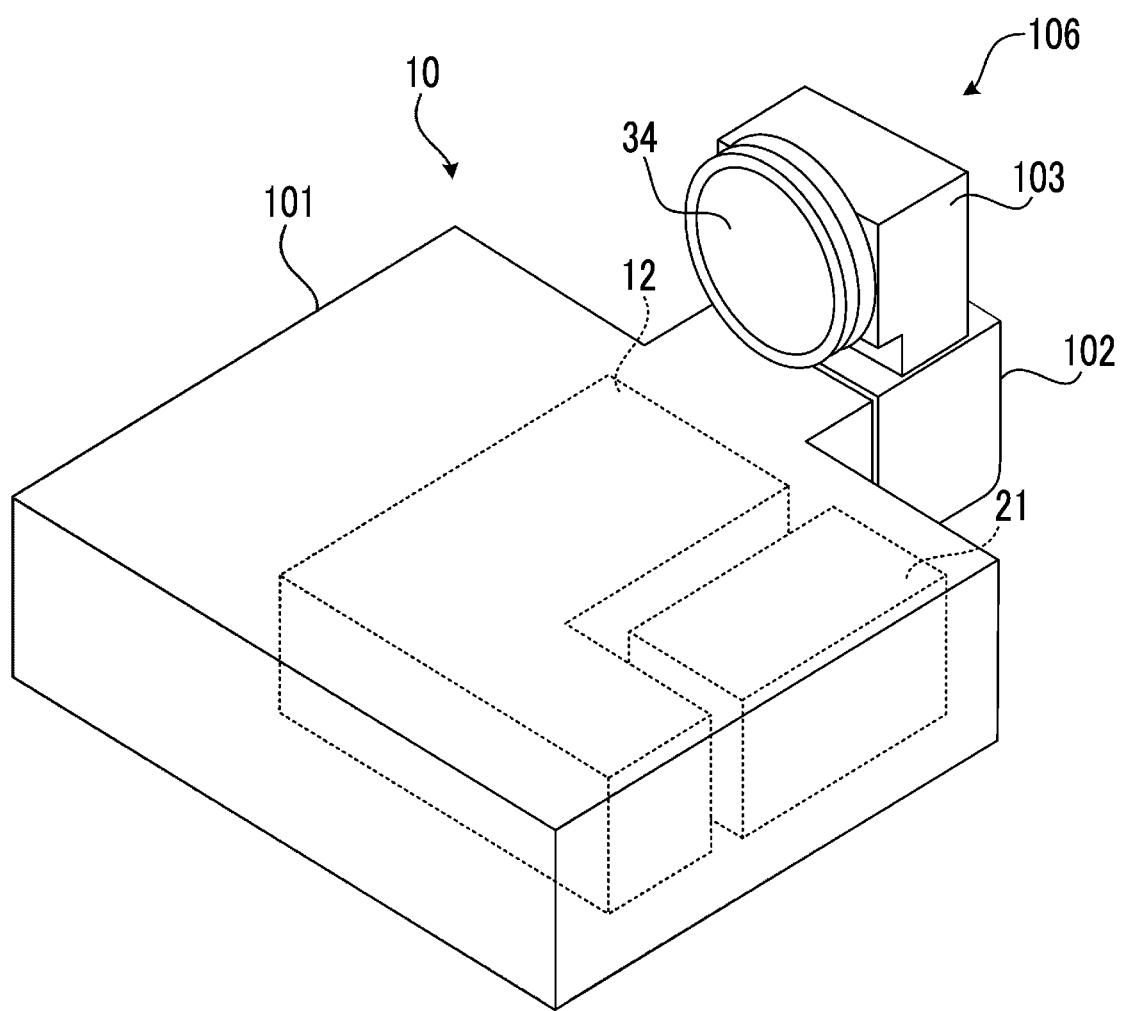
FIG. 3 is a schematic diagram illustrating an exterior configuration of the projection apparatus 10.
Figure 4:
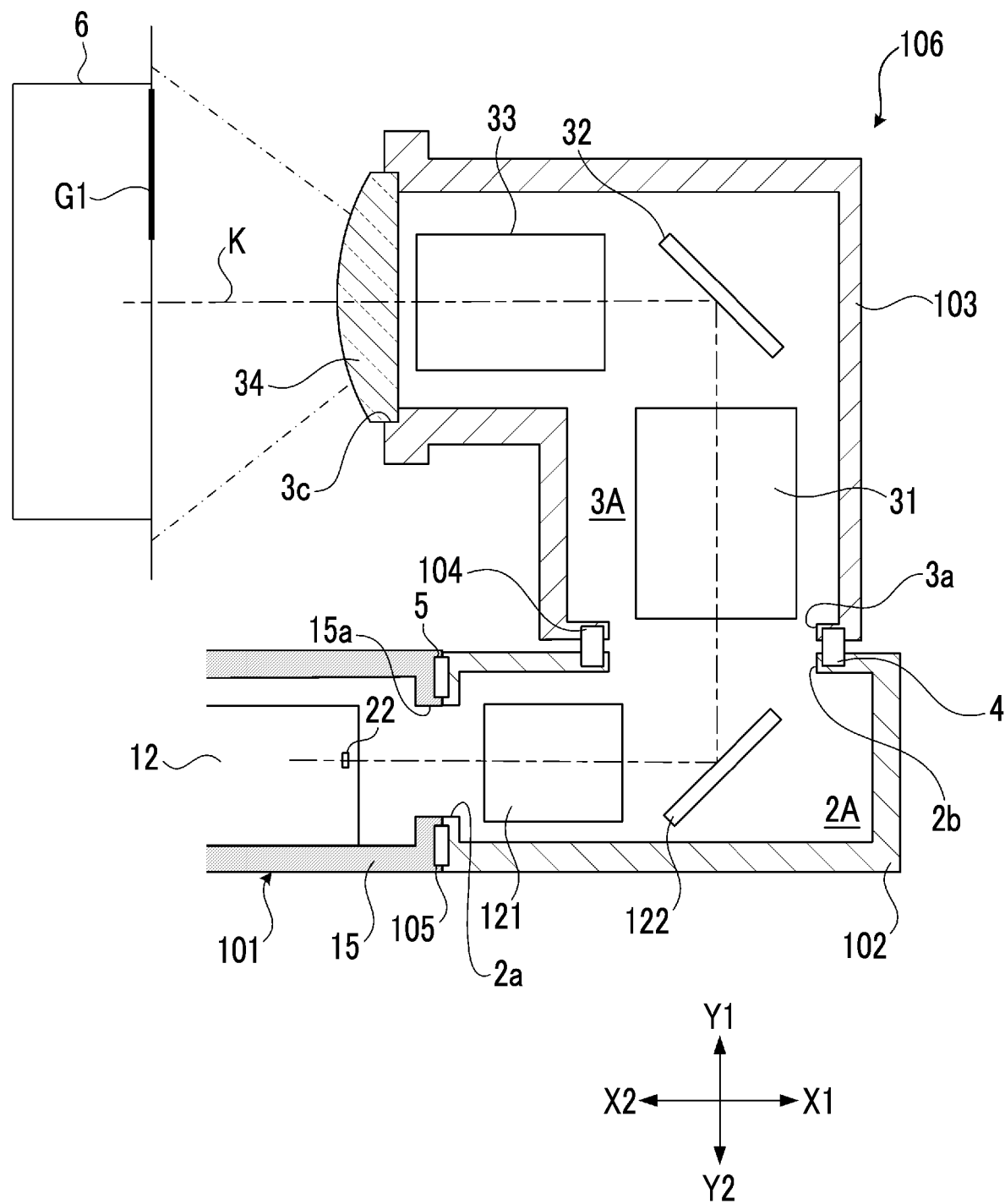
FIG. 4 is a schematic cross-sectional view of an optical unit 106 of the projection apparatus 10 illustrated in FIG. 3.

The projection portion 1, the control device 4, and the operation reception portion 2 are implemented by, for example, one device (for example, refer to FIG. 3 and FIG. 4). Alternatively, the projection portion 1, the control device 4, and the operation reception portion 2 may be separate devices that cooperate by communicating with each other.

<Internal Configuration of Projection Portion 1 Illustrated in FIG. 1>

Figure 2:
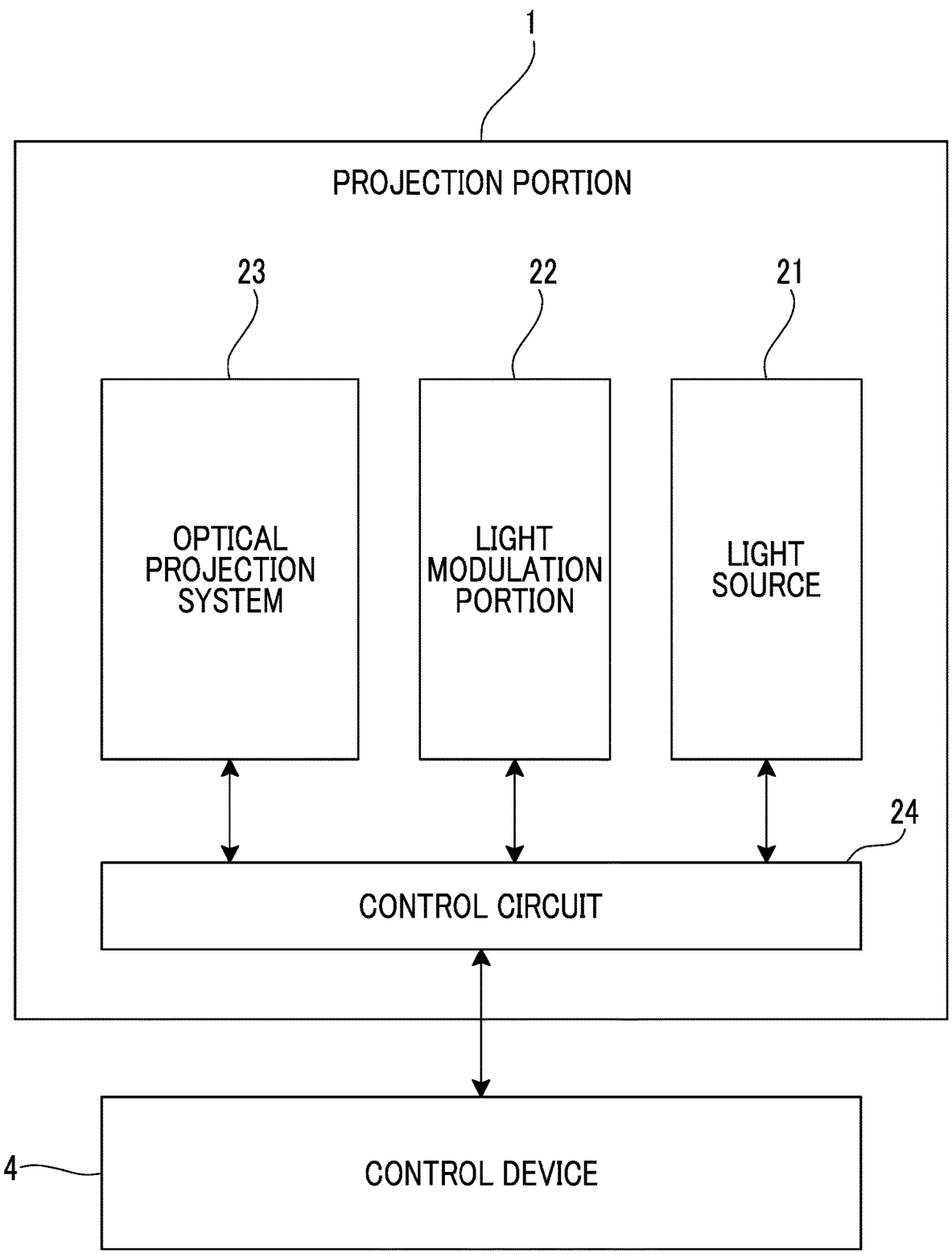
FIG. 2 is a schematic diagram illustrating an example of an internal configuration of a projection portion 1 illustrated in FIG. 1.

FIG. 2 is a schematic diagram illustrating an example of an internal configuration of the projection portion 1 illustrated in FIG. 1.

As illustrated in FIG. 2, the projection portion 1 comprises a light source 21, a light modulation portion 22, an optical projection system 23, and a control circuit 24.

The light source 21 includes a light emitting element such as a laser or a light emitting diode (LED) and emits, for example, white light.

The light modulation portion 22 is configured with three liquid crystal panels that modulate, based on image information, color light of each of three colors of red, blue, and green which is emitted from the light source 21 and which is separated by a color separation mechanism, not illustrated, and that emit images of each color. Filters of red, blue, and green may be mounted in the three liquid crystal panels, respectively, and the images of each color may be emitted by modulating the white light emitted from the light source 21 in each liquid crystal panel.

The light from the light source 21 and the light modulation portion 22 is incident on the optical projection system 23. The optical projection system 23 includes at least one lens and is composed of, for example, a relay optical system. The light that has passed through the optical projection system 23 is projected to the projection object 6.

In the projection object 6, a region irradiated with the light transmitted through the entire range of the light modulation portion 22 is the projectable range in which the projection can be performed by the projection portion 1. In the projectable range, a region irradiated with the light actually transmitted through the light modulation portion 22 is the projection range 11. For example, in the projectable range, a size, a position, and a shape of the projection range 11 are changed by controlling a size, a position, and a shape of a region through which the light is transmitted in the light modulation portion 22.

The control circuit 24 projects an image based on display data to the projection object 6 by controlling the light source 21, the light modulation portion 22, and the optical projection system 23 based on the display data input from the control device 4. The display data input into the control circuit 24 is configured with three constituents of red display data, blue display data, and green display data.

In addition, the control circuit 24 enlarges or reduces the projection range 11 (refer to FIG. 1) of the projection portion 1 by changing the optical projection system 23 based on an instruction input from the control device 4. In addition, the control device 4 may move the projection range 11 of the projection portion 1 by changing the optical projection system 23 based on the operation received by the operation reception portion 2 from the user.

In addition, the projection apparatus 10 comprises a shift mechanism that mechanically or optically moves the projection range 11 while maintaining an image circle of the optical projection system 23. The image circle of the optical projection system 23 is a region in which the projection light incident on the optical projection system 23 appropriately passes through the optical projection system 23 in terms of a light fall-off, color separation, edge part curvature, or the like.

The shift mechanism is implemented by at least any of an optical system shift mechanism that performs optical system shifting, or an electronic shift mechanism that performs electronic shifting.

The optical system shift mechanism is, for example, a mechanism (for example, refer to FIG. 3 and FIG. 4) that moves the optical projection system 23 in a direction perpendicular to an optical axis, or is a mechanism that moves the light modulation portion 22 in the direction perpendicular to the optical axis instead of moving the optical projection system 23. In addition, the optical system shift mechanism may perform the movement of the optical projection system 23 and the movement of the light modulation portion 22 in combination with each other.

The electronic shift mechanism is a mechanism that performs pseudo shifting of the projection range 11 by changing a range through which the light is transmitted in the light modulation portion 22.

In addition, the projection apparatus 10 may comprise a projection direction changing mechanism that moves the image circle of the optical projection system 23 and the projection range 11. The projection direction changing mechanism is a mechanism that changes a projection direction of the projection portion 1 by changing a direction of the projection portion 1 via mechanical rotation (for example, refer to FIG. 3 and FIG. 4).

<Mechanical Configuration of Projection Apparatus 10>

FIG. 3 is a schematic diagram illustrating an exterior configuration of the projection apparatus 10. FIG. 4 is a schematic cross-sectional view of an optical unit 106 of the projection apparatus 10 illustrated in FIG. 3. FIG. 4 illustrates a cross section in a plane along an optical path of the light emitted from a body part 101 illustrated in FIG. 3.

As illustrated in FIG. 3, the projection apparatus 10 comprises the body part 101 and the optical unit 106 that is provided to protrude from the body part 101. In the configuration illustrated in FIG. 3, the operation reception portion 2; the control device 4; and the light source 21, the light modulation portion 22, and the control circuit 24 in the projection portion 1 are provided in the body part 101. The optical projection system 23 in the projection portion 1 is provided in the optical unit 106.

The optical unit 106 comprises a first member 102 supported by the body part 101 and a second member 103 supported by the first member 102.

The first member 102 and the second member 103 may be an integrated member. The optical unit 106 may be configured to be attachable to and detachable from the body part 101 (in other words, configured to be interchangeable).

The body part 101 includes a housing 15 (refer to FIG. 4) in which an opening 15a (refer to FIG. 4) for passing light is formed in a part connected to the optical unit 106.

As illustrated in FIG. 3, the light source 21 and a light modulation unit 12 including the light modulation portion 22 (refer to FIG. 2) that generates an image by spatially modulating the light emitted from the light source 21 based on input image data are provided inside the housing 15 of the body part 101.

The light emitted from the light source 21 is incident on the light modulation portion 22 of the light modulation unit 12 and is spatially modulated and emitted by the light modulation portion 22.

As illustrated in FIG. 4, the image formed by the light spatially modulated by the light modulation unit 12 is incident on the optical unit 106 by passing through the opening 15a of the housing 15 and is projected to the projection object 6 as a projection target object. Accordingly, an image G1 is visible from an observer.

As illustrated in FIG. 4, the optical unit 106 comprises the first member 102 including a hollow portion 2A connected to the inside of the body part 101; the second member 103 including a hollow portion 3A connected to the hollow portion 2A; a first optical system 121 and a reflective member 122 disposed in the hollow portion 2A; a second optical system 31, a reflective member 32, a third optical system 33, and a lens 34 disposed in the hollow portion 3A; a shift mechanism 105; and a projection direction changing mechanism 104.

The first member 102 is a member having, for example, a rectangular cross-sectional exterior shape, in which an opening 2a and an opening 2b are formed in surfaces perpendicular to each other. The first member 102 is supported by the body part 101 in a state where the opening 2a is disposed at a position facing the opening 15a of the body part 101. The light emitted from the light modulation portion 22 of the light modulation unit 12 of the body part 101 is incident into the hollow portion 2A of the first member 102 through the opening 15a and through the opening 2a.

An incidence direction of the light incident into the hollow portion 2A from the body part 101 will be referred to as a direction X1. A direction opposite to the direction X1 will be referred to as a direction X2. The direction X1 and the direction X2 will be collectively referred to as a direction X. In addition, a direction from the front to the back of the page of FIG. 4 and an opposite direction thereto will be referred to as a direction Z. In the direction Z, the direction from the front to the back of the page will be referred to as a direction Z1, and the direction from the back to the front of the page will be referred to as a direction Z2.

In addition, a direction perpendicular to the direction X and to the direction Z will be referred to as a direction Y. In the direction Y, an upward direction in FIG. 4 will be referred to as a direction Y1, and a downward direction in FIG. 4 will be referred to as a direction Y2. In the example in FIG. 4, the projection apparatus 10 is disposed such that the direction Y2 is a vertical direction.

The optical projection system 23 illustrated in FIG. 2 is composed of the first optical system 121, the reflective member 122, the second optical system 31, the reflective member 32, the third optical system 33, and the lens 34. An optical axis K of the optical projection system 23 is illustrated in FIG. 4. The first optical system 121, the reflective member 122, the second optical system 31, the reflective member 32, the third optical system 33, and the lens 34 are disposed in this order from the light modulation portion 22 side along the optical axis K.

The first optical system 121 includes at least one lens and guides the light that is incident on the first member 102 from the body part 101 and that travels in the direction X1, to the reflective member 122.

The reflective member 122 reflects the light incident from the first optical system 121 in the direction Y1. The reflective member 122 is configured with, for example, a mirror. In the first member 102, the opening 2b is formed on the optical path of the light reflected by the reflective member 122, and the reflected light travels to the hollow portion 3A of the second member 103 by passing through the opening 2b.

The second member 103 is a member having an approximately T-shaped cross-sectional exterior shape, in which an opening 3a is formed at a position facing the opening 2b of the first member 102. The light that has passed through the opening 2b of the first member 102 from the body part 101 is incident into the hollow portion 3A of the second member 103 through the opening 3a. Cross-sectional exterior shapes of the first member 102 and the second member 103 are arbitrary and are not limited to the above.

The second optical system 31 includes at least one lens and guides the light incident from the first member 102 to the reflective member 32.

The reflective member 32 guides the light incident from the second optical system 31 to the third optical system 33 by reflecting the light in the direction X2. The reflective member 32 is configured with, for example, a mirror.

The third optical system 33 includes at least one lens and guides the light reflected by the reflective member 32 to the lens 34.

The lens 34 is disposed in an end part of the second member 103 on the direction X2 side in the form of closing an opening 3c formed in this end part. The lens 34 projects the light incident from the third optical system 33 to the projection object 6.

The projection direction changing mechanism 104 is a rotation mechanism that rotatably connects the second member 103 to the first member 102. By the projection direction changing mechanism 104, the second member 103 is configured to be rotatable about a rotation axis (specifically, the optical axis K) that extends in the direction Y. The projection direction changing mechanism 104 is not limited to the disposition position illustrated in FIG. 4 as long as the projection direction changing mechanism 104 can rotate the optical system. In addition, the number of rotation mechanisms is not limited to one, and a plurality of rotation mechanisms may be provided.

The shift mechanism 105 is a mechanism for moving the optical axis K of the optical projection system (in other words, the optical unit 106) in a direction (direction Y in FIG. 4) perpendicular to the optical axis K. Specifically, the shift mechanism 105 is configured to be capable of changing a position of the first member 102 in the direction Y with respect to the body part 101. The shift mechanism 105 may manually move the first member 102 or electrically move the first member 102.

FIG. 4 illustrates a state where the first member 102 is moved as far as possible to the direction Y1 side by the shift mechanism 105. By moving the first member 102 in the direction Y2 via the shift mechanism 105 from the state illustrated in FIG. 4, a relative position between a center of the image (in other words, a center of a display surface) formed by the light modulation portion 22 and the optical axis K changes, and the image G1 projected to the projection object 6 can be shifted (translated) in the direction Y2.

The shift mechanism 105 may be a mechanism that moves the light modulation portion 22 in the direction Y instead of moving the optical unit 106 in the direction Y. Even in this case, the image G1 projected to the projection object 6 can be moved in the direction Y2.

<Installation Support Apparatus 50 of Embodiment 1>

Figure 5:
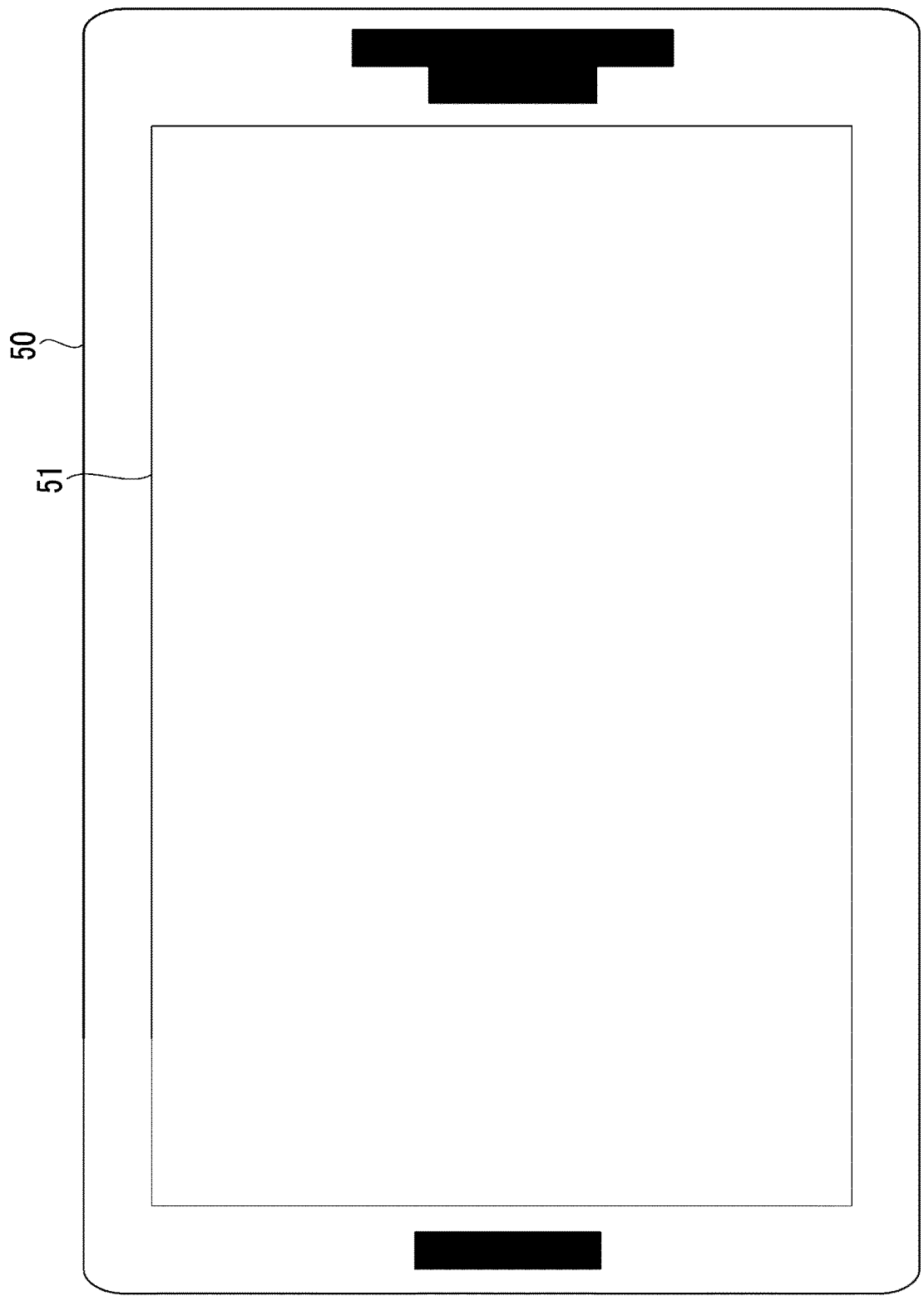
FIG. 5 is a diagram illustrating an example of an installation support apparatus 50 of Embodiment 1.

FIG. 5 is a diagram illustrating an example of an installation support apparatus 50 of Embodiment 1. The installation support apparatus 50 of Embodiment 1 is a tablet terminal including a touch panel 51. The touch panel 51 is a display on which a touch operation can be performed. For example, the user of the installation support apparatus 50 carries the installation support apparatus 50 into a space (for example, a room) in which projection is performed by installing the projection apparatus 10. The installation support apparatus 50 displays an installation support image for supporting installation of the projection apparatus 10 in the space via the touch panel 51.

<Hardware Configuration of Installation Support Apparatus 50>

Figure 6:
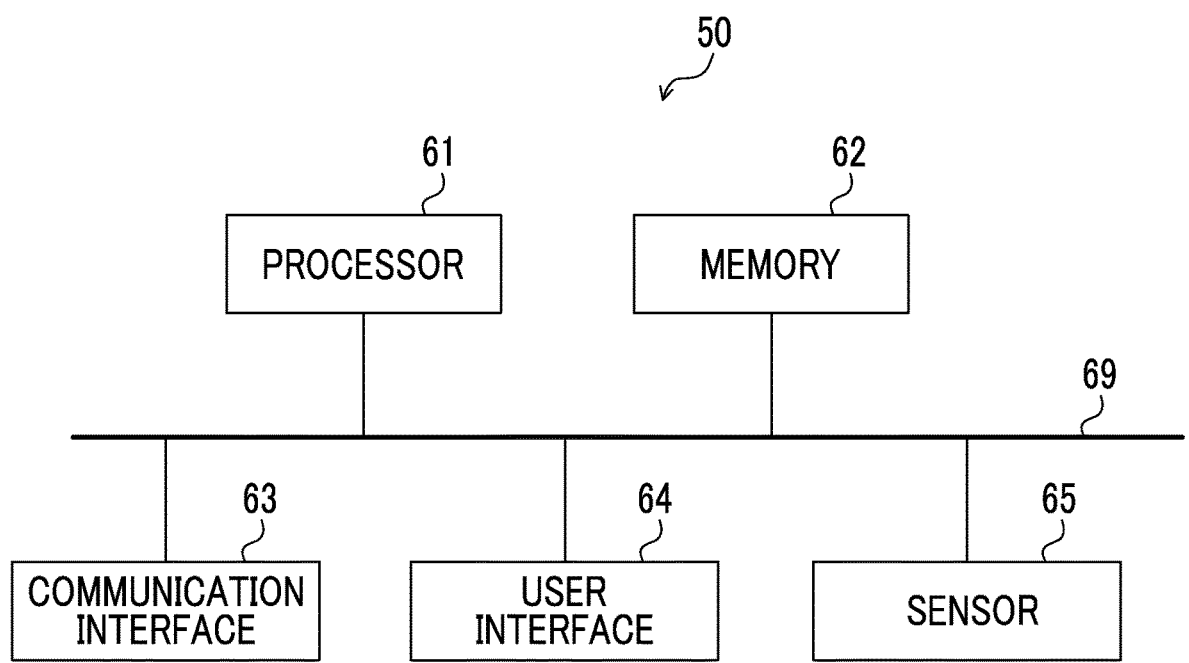
FIG. 6 is a diagram illustrating an example of a hardware configuration of the installation support apparatus 50 of Embodiment 1.
Figure 7:
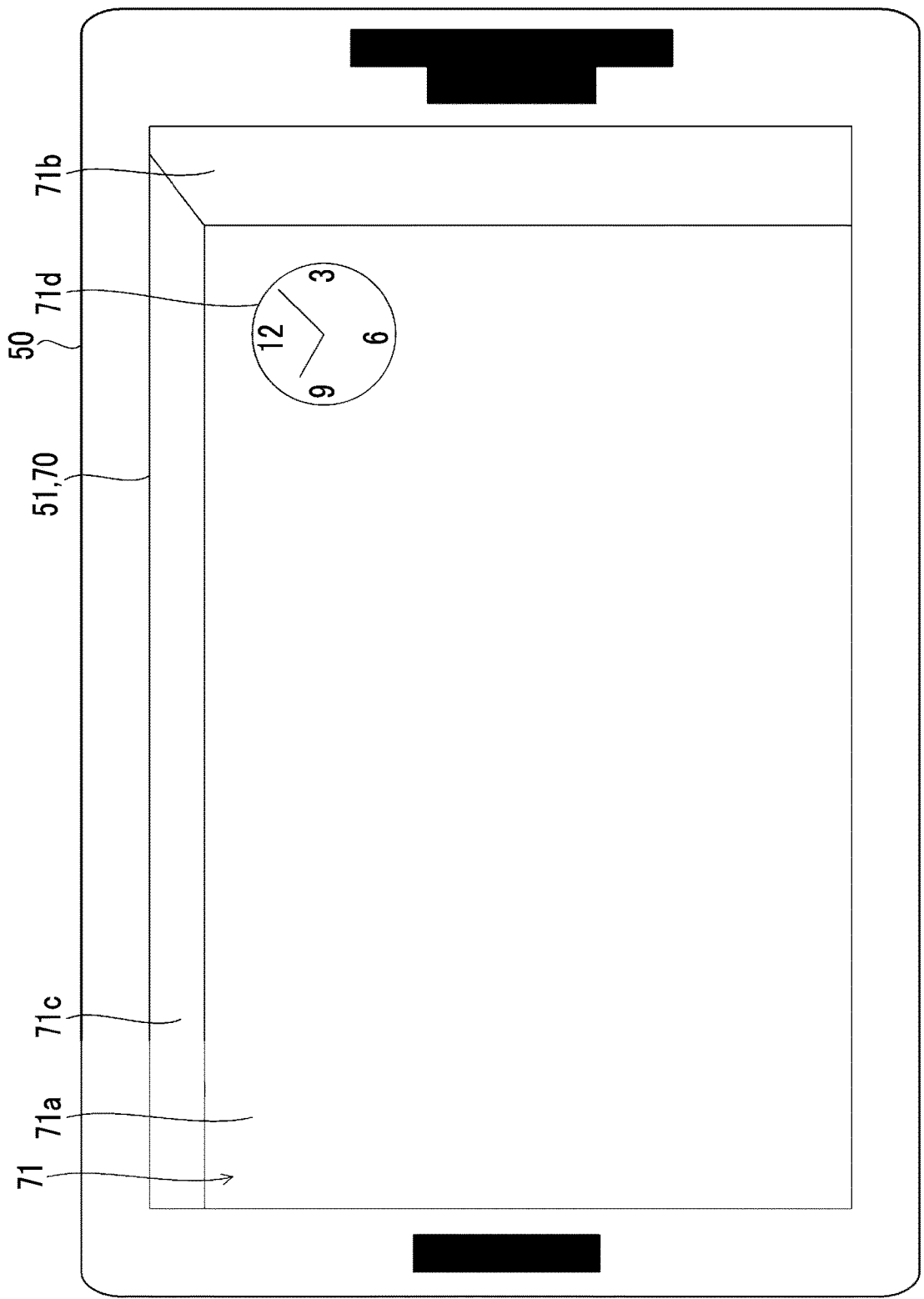
FIG. 7 is a diagram (Part 1) illustrating an example of supporting installation of the projection apparatus 10 via the installation support apparatus 50 of Embodiment 1.

FIG. 6 is a diagram illustrating an example of a hardware configuration of the installation support apparatus 50 of Embodiment 1. For example, as illustrated in FIG. 6, the installation support apparatus 50 illustrated in FIG. 5 comprises a processor 61, a memory 62, a communication interface 63, a user interface 64, and a sensor 65. The processor 61, the memory 62, the communication interface 63, the user interface 64, and the sensor 65 are connected by, for example, a bus 69.

The processor 61 is a circuit that performs signal processing, and is, for example, a CPU that controls the entire installation support apparatus 50. The processor 61 may be implemented by other digital circuits such as an FPGA and a digital signal processor (DSP). In addition, the processor 61 may be implemented by combining a plurality of digital circuits.

For example, the memory 62 includes a main memory and an auxiliary memory. For example, the main memory is a random access memory (RAM). The main memory is used as a work area of the processor 61.

For example, the auxiliary memory is a non-volatile memory such as a magnetic disk or a flash memory. The auxiliary memory stores various programs for operating the installation support apparatus 50. The programs stored in the auxiliary memory are loaded into the main memory and executed by the processor 61.

In addition, the auxiliary memory may include a portable memory that can be detached from the installation support apparatus 50. Examples of the portable memory include a memory card such as a universal serial bus (USB) flash drive or a secure digital (SD) memory card, and an external hard disk drive.

The communication interface 63 is a communication interface for communication between the installation support apparatus 50 and an external apparatus. The communication interface 63 includes at least any of a wired communication interface for performing wired communication or a wireless communication interface for performing wireless communication. The communication interface 63 is controlled by the processor 61.

The user interface 64 includes, for example, an input device that receives an operation input from the user, and an output device that outputs information to the user. The input device can be implemented by, for example, a key (for example, a keyboard) or a remote controller. The output device can be implemented by, for example, a display or a speaker. In the installation support apparatus 50 illustrated in FIG. 5, the input device and the output device are implemented by the touch panel 51. The user interface 64 is controlled by the processor 61.

The sensor 65 includes an imaging apparatus that includes an imaging optical system and an imaging element and that can perform imaging, a space recognition sensor that can three-dimensionally recognize a space around the installation support apparatus 50, and the like. For example, the imaging apparatus includes an imaging apparatus provided on a rear surface of the installation support apparatus 50 illustrated in FIG. 5.

The space recognition sensor is, as an example, light detection and ranging (LIDAR) which performs irradiation with laser light, measures a time taken until the laser light of irradiation hits an object and reflects back, and measures a distance and a direction to the object. However, the space recognition sensor is not limited thereto and can be various sensors such as a radar that emits radio waves and an ultrasonic sensor that emits ultrasound waves.

<Supporting Installation of Projection Apparatus 10 Via Installation Support Apparatus 50 of Embodiment 1>

FIG. 7 to FIG. 10 are diagrams illustrating an example of supporting installation of the projection apparatus 10 via the installation support apparatus 50 of Embodiment 1. For example, the installation support apparatus 50 displays a space image 70 via the touch panel 51. The space image 70 is an image showing a space 71 in which projection is performed by the projection apparatus 10. In the example in FIG. 7, the space 71 is a room including walls 71a and 71b and a ceiling 71c. In addition, a clock 71d is provided on the wall 71a.

The space image 70 is, for example, a live preview image (live view image) that shows, in real time, an image obtained by imaging performed by the imaging apparatus comprised in the installation support apparatus 50 as the sensor 65. In this case, the space image 70 shows the wall 71a and the like of the space 71 existing behind the installation support apparatus 50 in real time.

Figure 8:
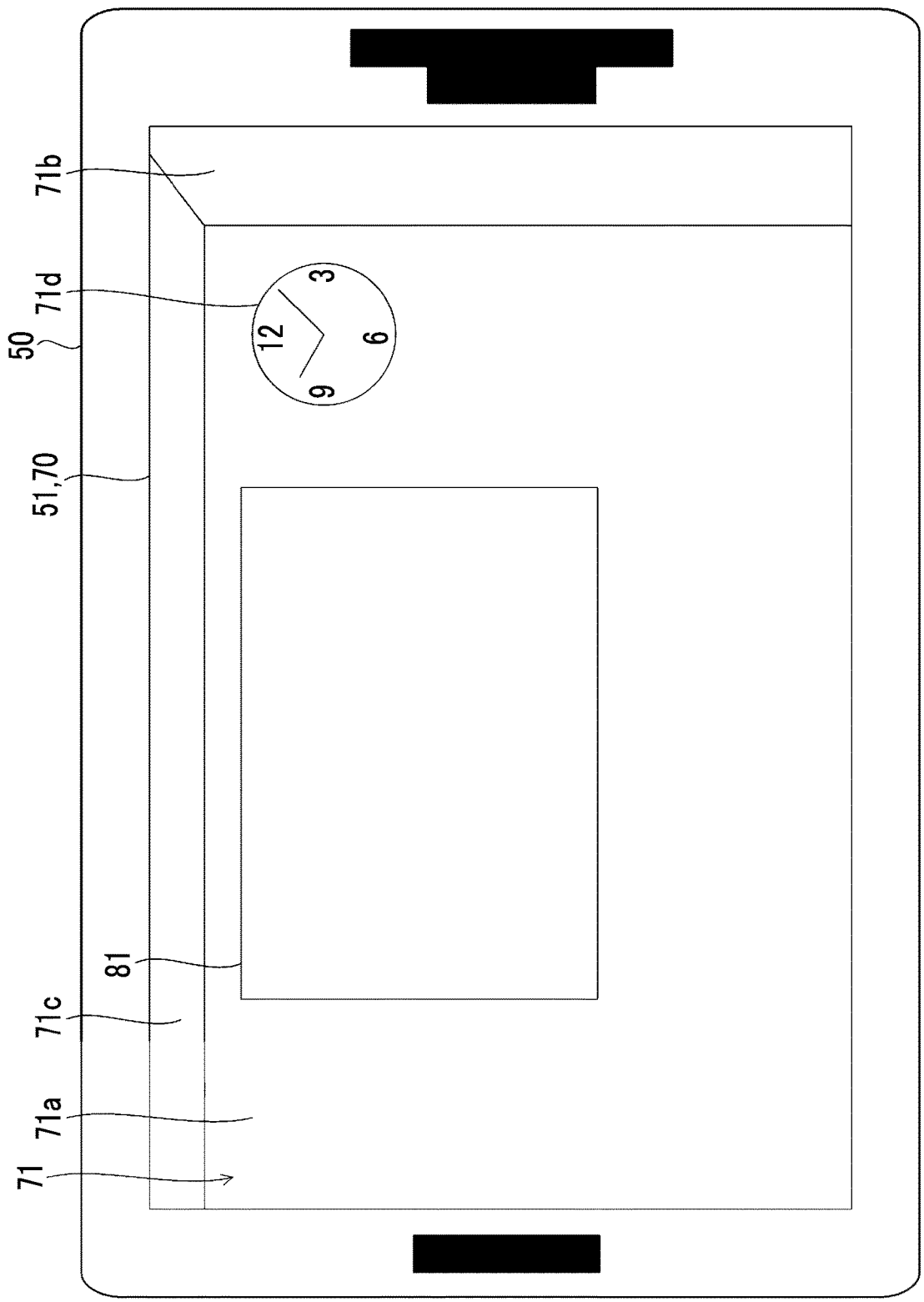
FIG. 8 is a diagram (Part 2) illustrating an example of supporting installation of the projection apparatus 10 via the installation support apparatus 50 of Embodiment 1.

As illustrated in FIG. 8, the installation support apparatus 50 receives an input of a projection range 81 in the space 71 from the user. For example, the user performs a touch operation or the like to designate a range to be set as the projection range 81 in the space image 70 displayed on the touch panel 51. In the example illustrated in FIG. 8, the user designates a rectangular range separated from the clock 71d in the wall 71a as the projection range 81.

For example, the installation support apparatus 50 generates correspondence information between positional coordinates in the space 71 three-dimensionally recognized by the space recognition sensor comprised as the sensor 65 and positional coordinates in the space image 70 two-dimensionally displayed by the touch panel 51. Then, the installation support apparatus 50, using the correspondence information, converts the range designated by the user in the space image 70 displayed on the touch panel 51 into the projection range 81 defined by positional coordinates in the three-dimensionally recognized space 71. Accordingly, the installation support apparatus 50 can receive the input of the projection range 81 of the projection apparatus 10 from the user.

Figure 9:
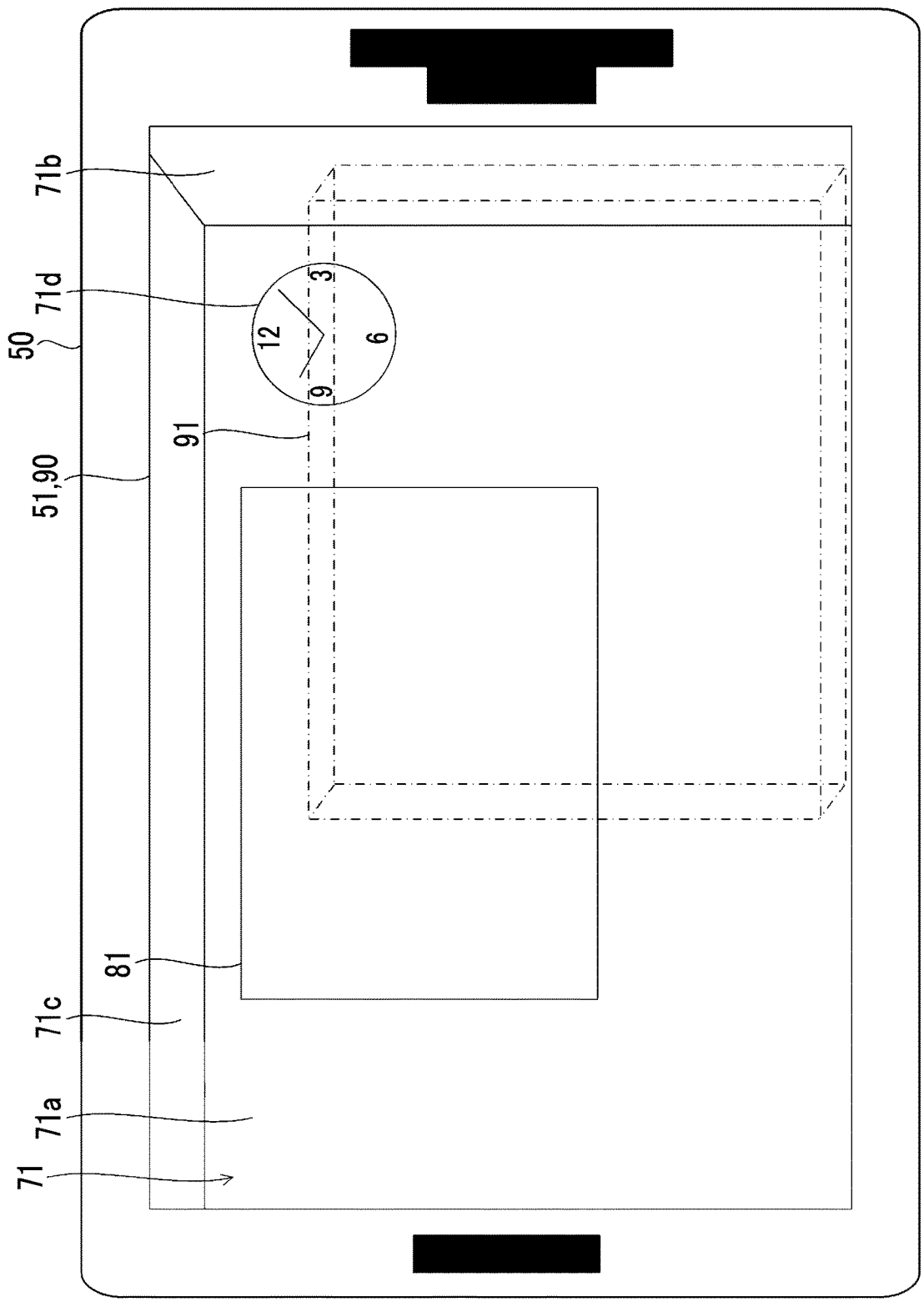
FIG. 9 is a diagram (Part 3) illustrating an example of supporting installation of the projection apparatus 10 via the installation support apparatus 50 of Embodiment 1.

As illustrated in FIG. 9, the installation support apparatus 50 calculates, based on the input projection range 81, an installation range 91 in which the projection apparatus 10 can be installed in the space 71, and displays an image obtained by superimposing an image (for example, a frame line) showing the calculated installation range 91 on the space image 70 via the touch panel 51 as an installation support image 90. For example, the installation support apparatus 50, using the correspondence information, converts the calculated installation range 91 into a range defined by two-dimensional positional coordinates in the space image 70 and superimposes an image showing the converted range on the space image 70. Calculation of the installation range 91 based on the projection range 81 will be described later.

In such a manner, the installation support apparatus 50 calculates, based on the input of the projection range 81 of the projection apparatus 10 in the space 71 (space) in which projection is performed by the projection apparatus 10, the installation range 91 in which the projection apparatus 10 can be installed in the space 71, and displays the installation support image 90 obtained by superimposing the image showing the calculated installation range 91 on the space image 70 showing the space 71.

Accordingly, the user can intuitively recognize where to install the projection apparatus 10 in the space 71 in order to perform projection to the desired projection range 81. Thus, installation of the projection apparatus 10 can be facilitated.

In addition, since the installation support image 90 can be displayed even without the actual projection apparatus 10, installation of the projection apparatus 10 can be easily planned.

In addition, in a case where an imaging range has changed, that is, a range of the space 71 shown by the space image 70 has changed, because of movement of the installation support apparatus 50 or of a change in a direction of the installation support apparatus 50, the installation support apparatus 50 may calculate a range to which the installation range 91 corresponds in the space image 70 again, and update the image of the installation range 91 in the installation support image 90. Accordingly, the user can more intuitively recognize the installation range 91 in the space 71 by moving the installation support apparatus 50 or by changing the direction of the installation support apparatus 50. Thus, installation of the projection apparatus 10 can be further facilitated.

Figure 10:
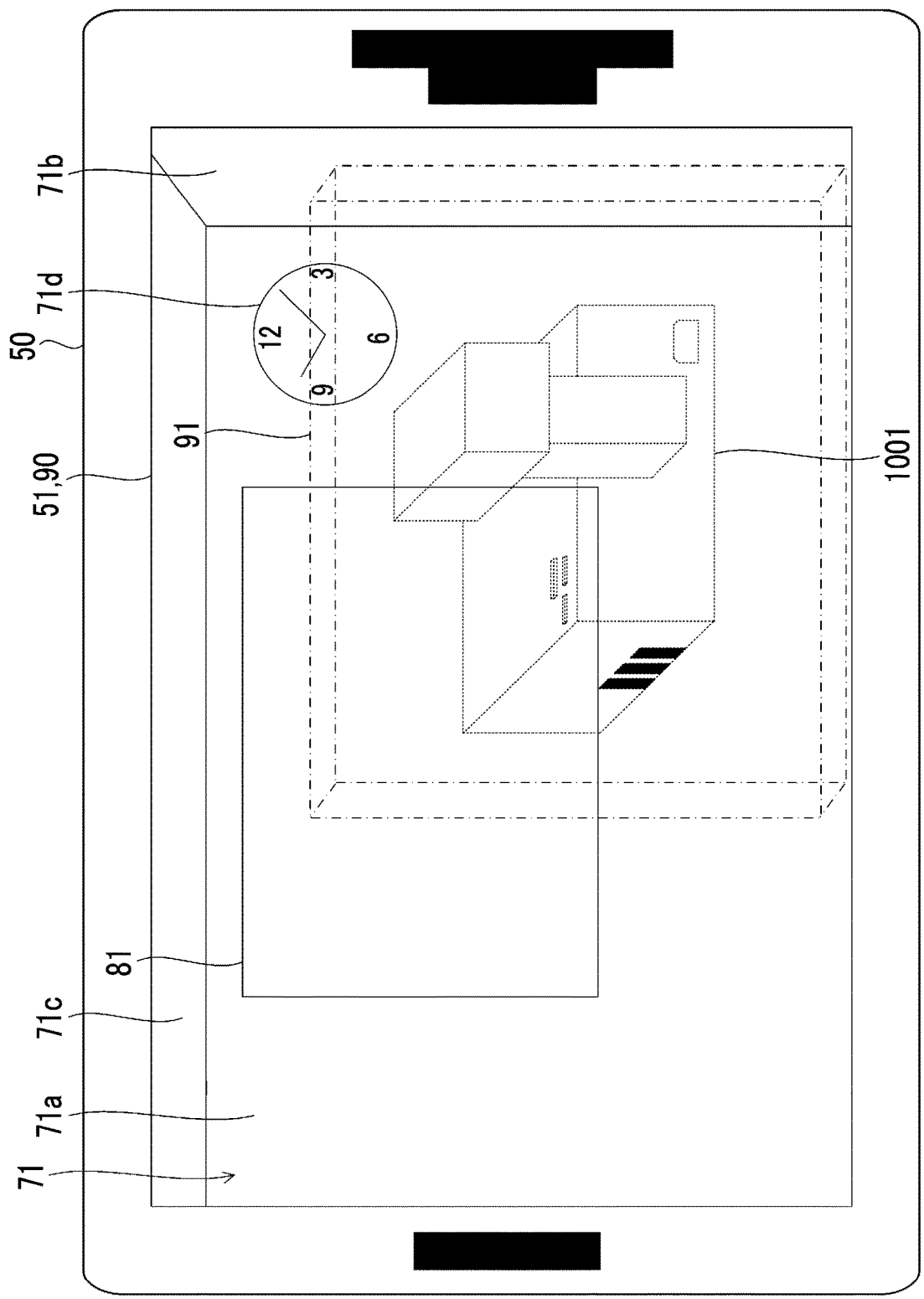
FIG. 10 is a diagram (Part 4) illustrating an example of supporting installation of the projection apparatus 10 via the installation support apparatus 50 of Embodiment 1.

In addition, as illustrated in FIG. 10, the installation support apparatus 50 may display the installation support image 90 obtained by further superimposing a projection apparatus image 1001 showing the projection apparatus 10 on the space image 70 together with the image of the installation range 91. The projection apparatus image 1001 can be moved by operation (for example, a touch operation) of the user, and the user can temporarily determine an installation position of the projection apparatus 10 by moving the projection apparatus image 1001. The installation support apparatus 50 may calculate a parameter such as a shift amount in performing projection to the projection range 81 by installing the projection apparatus 10 at the temporarily determined installation position, and may display an image showing the calculated parameter in a superimposed manner on the installation support image 90. Accordingly, the user can easily perceive the parameter such as the shift amount in performing projection to the projection range 81 by installing the projection apparatus 10 at a position of the projection apparatus image 1001. Thus, installation of the projection apparatus 10 can be facilitated. In addition, by displaying the projection apparatus image 1001, the user can intuitively recognize that the installation range 91 is a range in which the projection apparatus 10 can be installed. Thus, installation of the projection apparatus 10 can be facilitated.

<Calculation of Installation Range 91 Based on Structure of Space 71>

The installation support apparatus 50 calculates the installation range 91 based on, for example, the projection range 81 and on information indicating a structure of the space 71 (may include a structure such as an obstacle present in the space 71). For example, the information indicating the structure of the space 71 may be acquired by the space recognition sensor comprised in the installation support apparatus 50 or may be input into the installation support apparatus 50 from the outside as space data.

For example, in a case where the projection range 81 is a rectangular range along the wall 71*a* as illustrated in FIG. 8, the installation support apparatus 50 calculates, as the installation range 91, a range obtained by excluding, from an installation range calculated based on the input of the projection range 81 and on an angle of view and the like of the projection apparatus 10, the range in which projection is cut by an obstacle present in a space between the projection range and the installation range. Accordingly, the installation range 91 in which the projection light of the projection apparatus 10 is not blocked can be calculated.

In such a manner, the installation support apparatus 50 can calculate, in accordance with the structure of the space 71, the installation range 91 in which projection can be performed to the projection range 81, by calculating the installation range 91 based on the projection range 81 and on the information indicating the structure of the space 71.

<Calculation of Installation Range 91 Based on Specifications of Projection Apparatus 10>

The installation support apparatus 50 may perform processing of excluding, from the installation range 91, a range in which the projection apparatus 10 is not focused on the projection range 81 because the projection apparatus 10 is excessively close to the projection range 81 (wall 71*a*), or in which the projectable range of the projection apparatus 10 cannot cover the projection range 81. For example, this processing is performed based on information indicating specifications of the projection apparatus 10 such as the shortest projectable distance and the angle of view of the projection apparatus 10.

In addition, the installation support apparatus 50 performs processing of excluding, from the installation range 91, a range in which resolution or brightness of the projection image in the projection range 81 does not satisfy a reference (a criterion) because the projection apparatus 10 is excessively far from the projection range 81 (wall 71*a*). For example, this processing is performed based on information indicating the specifications of the projection apparatus 10 such as information about the longest projection distance in which resolution or brightness of the projection apparatus 10 satisfies the reference.

In addition, the installation support apparatus 50 may perform processing of expanding the installation range 91 based on a range in which the projection range 11 of the projection apparatus 10 can be shifted, or on a range in which the projection direction of the projection apparatus 10 can be changed. For example, this processing is performed based on information indicating specifications of the shift mechanism or specifications of the projection direction changing mechanism 104 of the projection apparatus 10.

In addition, the installation support apparatus 50 may perform processing of excluding, from the installation range 91, a range in which the projection apparatus 10 cannot be installed in terms of space, based on information indicating a dimension of the projection apparatus 10 and on the information indicating the structure of the space 71.

In addition, the installation support apparatus 50 may perform processing of excluding, from the installation range 91, a range in which an air intake port or an air exhaust port of the projection apparatus 10 is blocked by a wall or by an obstacle in a case where the projection apparatus 10 is installed, based on information indicating a position of the air intake port or of the air exhaust port of the projection apparatus 10 and on the information indicating the structure of the space 71.

In addition, the installation support apparatus 50 may perform processing of excluding, from the installation range 91, a range in which it is difficult to connect a cable of the projection apparatus 10 because of a wall or of an obstacle in a case where the projection apparatus 10 is installed, based on information indicating a connection position of the cable in the projection apparatus 10 and on the information indicating the structure of the space 71.

In such a manner, by calculating the installation range 91 based on the information indicating the specifications of the projection apparatus 10, the installation support apparatus 50 can calculate and display the appropriate installation range 91 corresponding to the specifications of the projection apparatus 10 without the actual projection apparatus 10.

<Calculation of Installation Range 91 Based on Non-Installation Range of Projection Apparatus 10>

The installation support apparatus 50 may perform processing of excluding a non-installation range of the projection apparatus 10 in the space 71 from the installation range 91. The non-installation range of the projection apparatus 10 is a range that is set by the user and in which the projection apparatus 10 is not installed. For example, a position seen from a passage or from an audience or a position close to the audience (a position at which a driving sound or heat of the projection apparatus 10 causes a problem) is set as the non-installation range of the projection apparatus 10.

In such a manner, by calculating the installation range 91 based on the projection range 81 and on information indicating the non-installation range of the projection apparatus 10 in the space 71, the installation support apparatus 50 can exclude the non-installation range of the projection apparatus 10 set by the user in accordance with various matters from the installation range 91.

<Calculation of Installation Range 91 in which Projection Quality of Projection Apparatus 10 is Satisfied>

The installation support apparatus 50 may calculate the installation range 91 in which the projection quality of the image projected to the projection range 81 from the projection apparatus 10 satisfies a reference. For example, the projection quality is brightness, resolution, and distortion of the projection image. The brightness of the projection image may include a light fall-off in an edge part.

For example, the further the installation position of the projection apparatus 10 is separated from the projection range 81, the more the brightness or resolution of the projection image is decreased. Thus, the installation support apparatus 50 may perform processing of excluding, from the installation range 91, a range in which the brightness or resolution of the projection image is less than a predetermined reference.

In addition, in a case where the projection range 11 of the projection apparatus 10 is shifted, or the projection direction of the projection apparatus 10 is changed, the projection image of the projection apparatus 10 is distorted. In addition, even in a case where distortion correction of correcting the distortion of the projection image is performed, a decrease in the brightness or resolution of the projection image occurs. Thus, the installation support apparatus 50 may perform processing of excluding, from the installation range 91, a range in which the distortion of the projection image is greater than a predetermined reference. For example, in a case of performing processing of expanding the installation range 91 as described above based on the range in which the projection range 11 of the projection apparatus 10 can be shifted, or on the range in which the projection direction of the projection apparatus 10 can be changed, the installation support apparatus 50 performs the processing of expanding in a range in which the distortion of the projection image is not greater than the predetermined reference.

In such a manner, by calculating the installation range 91 in which the projection quality of the image projected to the projection range 81 from the projection apparatus 10 satisfies the reference, the installation support apparatus 50 can facilitate installation of the projection apparatus 10 of which the projection quality satisfies the reference.

<Display of Guide Information by Installation Support Apparatus 50 of Embodiment 1>

Figure 11:
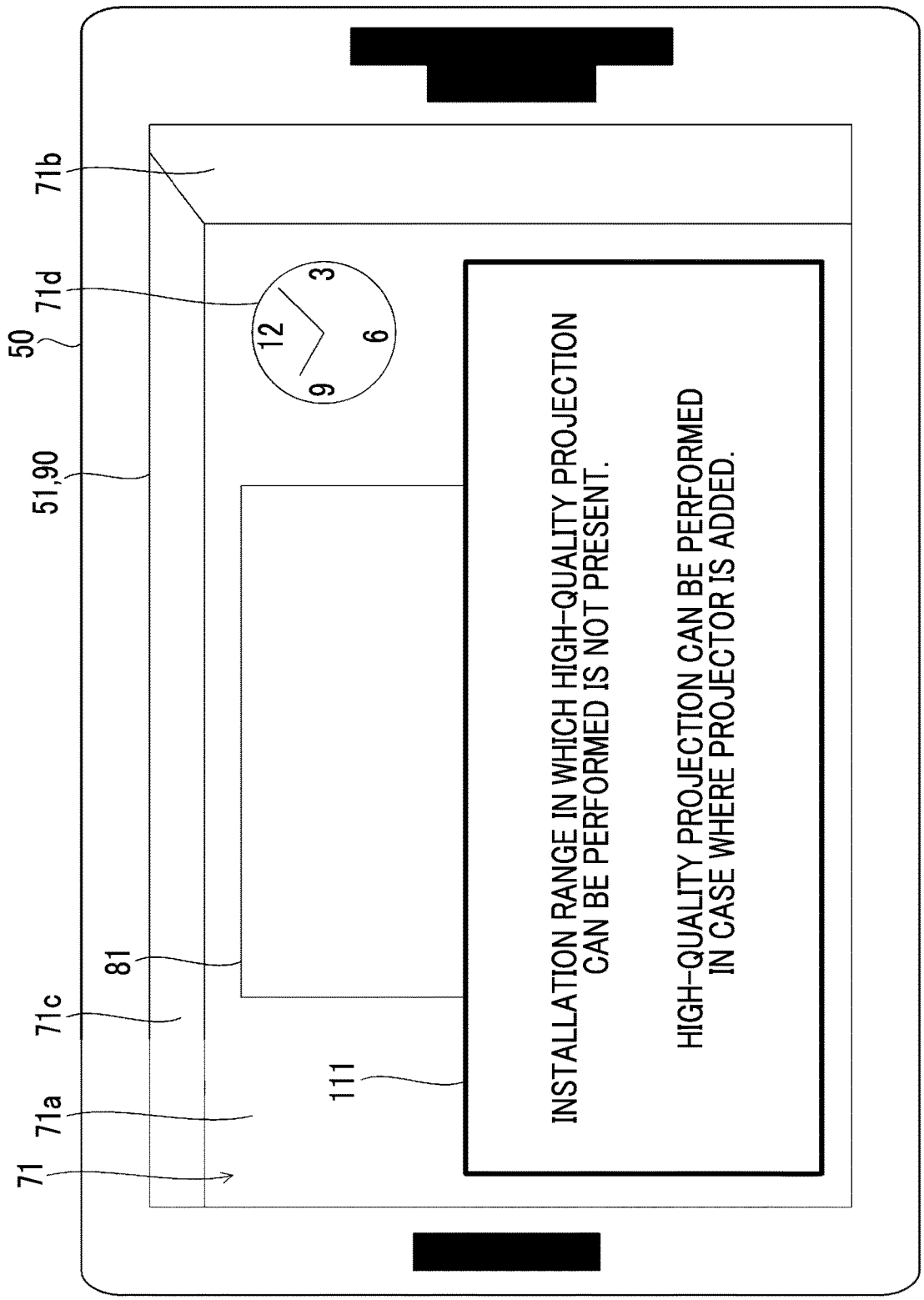
FIG. 11 is a diagram illustrating an example of display of guide information by the installation support apparatus 50 of Embodiment 1.

FIG. 11 is a diagram illustrating an example of display of guide information by the installation support apparatus 50 of Embodiment 1. In a case where the installation range 91 in which the projection quality of the image projected to the projection range 81 from the projection apparatus 10 satisfies the reference is not present, the installation support apparatus 50 may display the installation support image 90 including information that prompts at least any of addition or changing of the projection apparatus 10.

For example, in a case where the projection quality can be improved by performing projection using a plurality of the projection apparatuses 10, the information prompting addition of the projection apparatus 10 is information that guides the user to add the projection apparatus 10 so that the projection quality satisfies the reference. The information prompting changing of the projection apparatus 10 is information that guides the user to change the projection apparatus 10 to one having higher performance so that the projection quality satisfies the reference.

As an example, the installation support apparatus 50 may display the installation support image 90 including guide information 111 instead of the installation range 91 via the touch panel 51 as illustrated in FIG. 11. The guide information 111 includes a message indicating that the installation range 91 in which high-quality projection can be performed is not present, and a message indicating that high-quality projection can be performed in a case where a projector (projection apparatus 10) is added.

<Display of Installation Range of Projection Apparatus 10 for Each Projection Quality by Installation Support Apparatus 50 of Embodiment 1>

Figure 12:
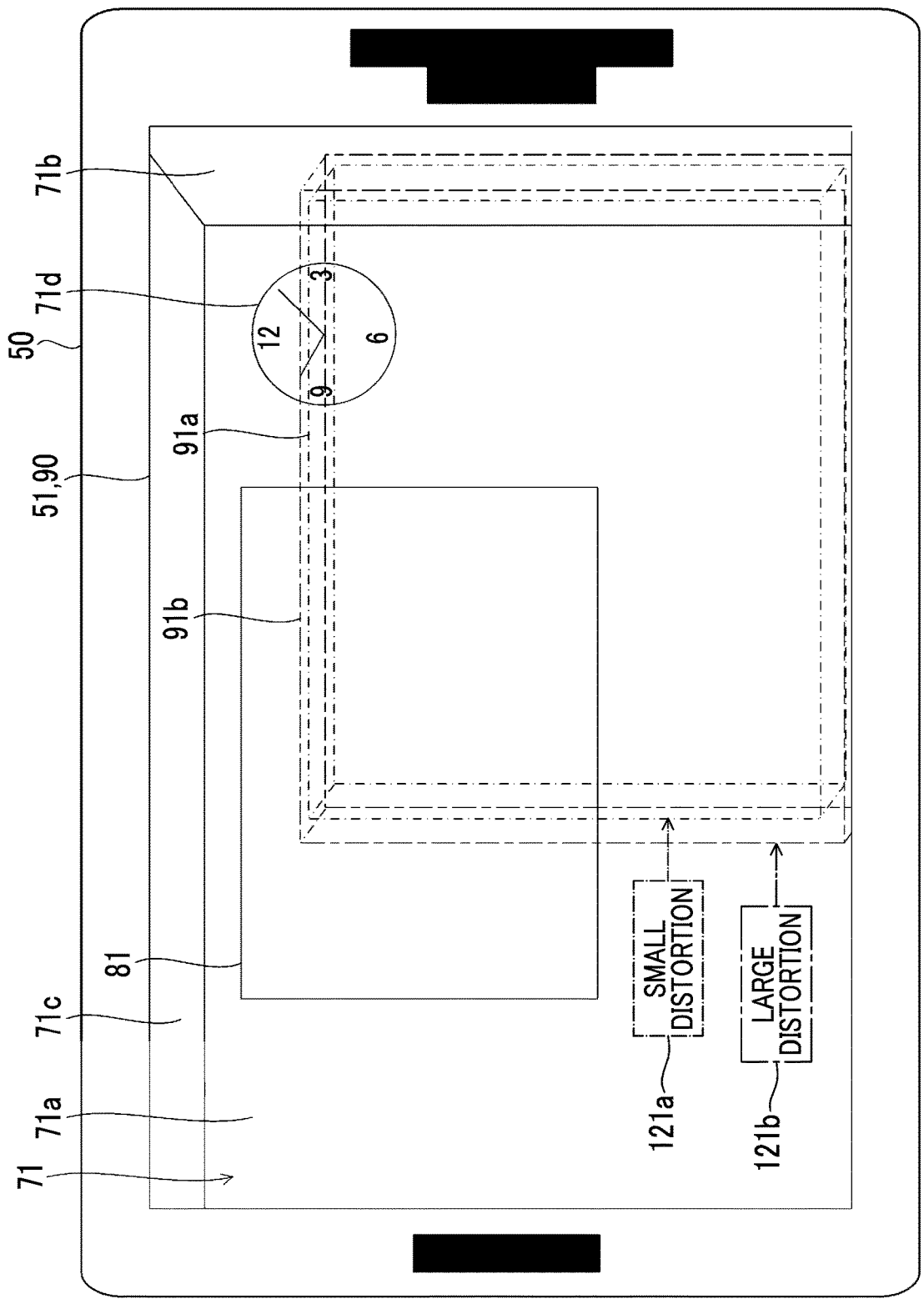
FIG. 12 is a diagram illustrating an example of display of an installation range of the projection apparatus 10 for each projection quality by the installation support apparatus 50 of Embodiment 1.

FIG. 12 is a diagram illustrating an example of display of the installation range of the projection apparatus 10 for each projection quality by the installation support apparatus 50 of Embodiment 1. In a case where the image can be projected to the projection range 81 from the projection apparatus 10 with a plurality of types of projection quality, the installation support apparatus 50 may calculate the installation range 91 in which the projection apparatus 10 can be installed in the space 71 for each of the plurality of types of projection quality. In this case, the installation support apparatus 50 displays the installation support image 90 obtained by superimposing the image showing the calculated installation range 91 for each projection quality on the space image 70.

As an example, in a case where the projection apparatus 10 can perform projection without shifting the projection range 11 (distortion of the projection image is small) and projection by shifting the projection range 11 (distortion of the projection image is large), the installation support apparatus 50 may display an installation range 91a of the projection apparatus 10 in which projection without shifting the projection range 11 can be performed, and an installation range 91b of the projection apparatus 10 in which projection by shifting the projection range 11 can be performed.

At this point, the installation support apparatus 50 may display quality information 121a and 121b indicating the projection quality of the installation ranges 91a and 91b, respectively, by including the quality information 121a and 121b in the installation support image 90. The quality information 121a indicates that the installation range 91a is the installation range of the projection apparatus 10 in which the distortion of the projection image is relatively small. The quality information 121b indicates that the installation range 91b is the installation range of the projection apparatus 10 in which the distortion of the projection image is relatively large.

While whether or not the projection range 11 is shifted is described as the plurality of types of projection quality, the plurality of types of projection quality is not limited thereto. For example, the plurality of types of projection quality may be a plurality of values of the shift amount of the projection range 11 or may be whether or not the projection direction of the projection apparatus 10 is changed, or a plurality of values of an amount of change in the projection direction of the projection apparatus 10. In addition, the plurality of types of projection quality may be a plurality of values of the brightness of the projection image of the projection apparatus 10, a plurality of values of the resolution of the projection image of the projection apparatus 10, or the like.

<Plurality of Projection Apparatuses as Target to Be Supported for Installation by Installation Support Apparatus 50 of Embodiment 1>

Figure 13:
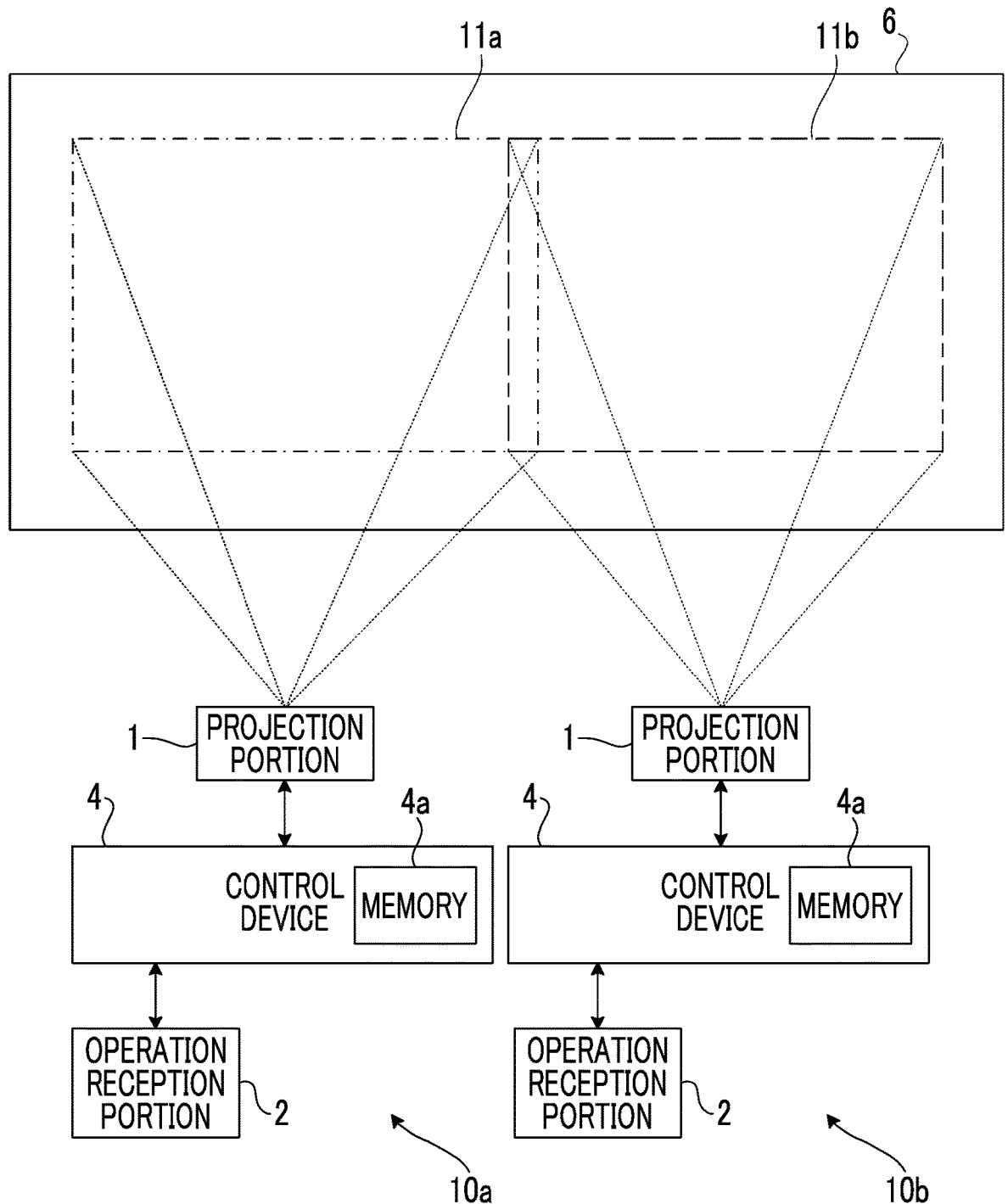
FIG. 13 is a schematic diagram illustrating an example of a plurality of projection apparatuses as a target to be supported for installation by the installation support apparatus 50 of Embodiment 1.

FIG. 13 is a schematic diagram illustrating an example of a plurality of projection apparatuses as a target to be supported for installation by the installation support apparatus 50 of Embodiment 1. For example, the installation support apparatus 50 may display the installation support image 90 for supporting installation of a first projection apparatus 10a and of a second projection apparatus 10b.

For example, each of the first projection apparatus 10a and the second projection apparatus 10b is the same projection apparatus as the projection apparatus 10. A first projection range 11a is a region irradiated with the projection light by the projection portion 1 of the first projection apparatus 10a. A second projection range 11b is a region irradiated with the projection light by the projection portion 1 of the second projection apparatus 10b.

Wider-range projection can be performed using the first projection range 11a and the second projection range 11b. At this point, the first projection range 11a and the second projection range 11b may be partially superimposed on each other as illustrated in FIG. 13.

First Example of Supporting Installation of Plurality of Projection Apparatuses Via Installation Support Apparatus 50 of Embodiment 1

Figure 14:
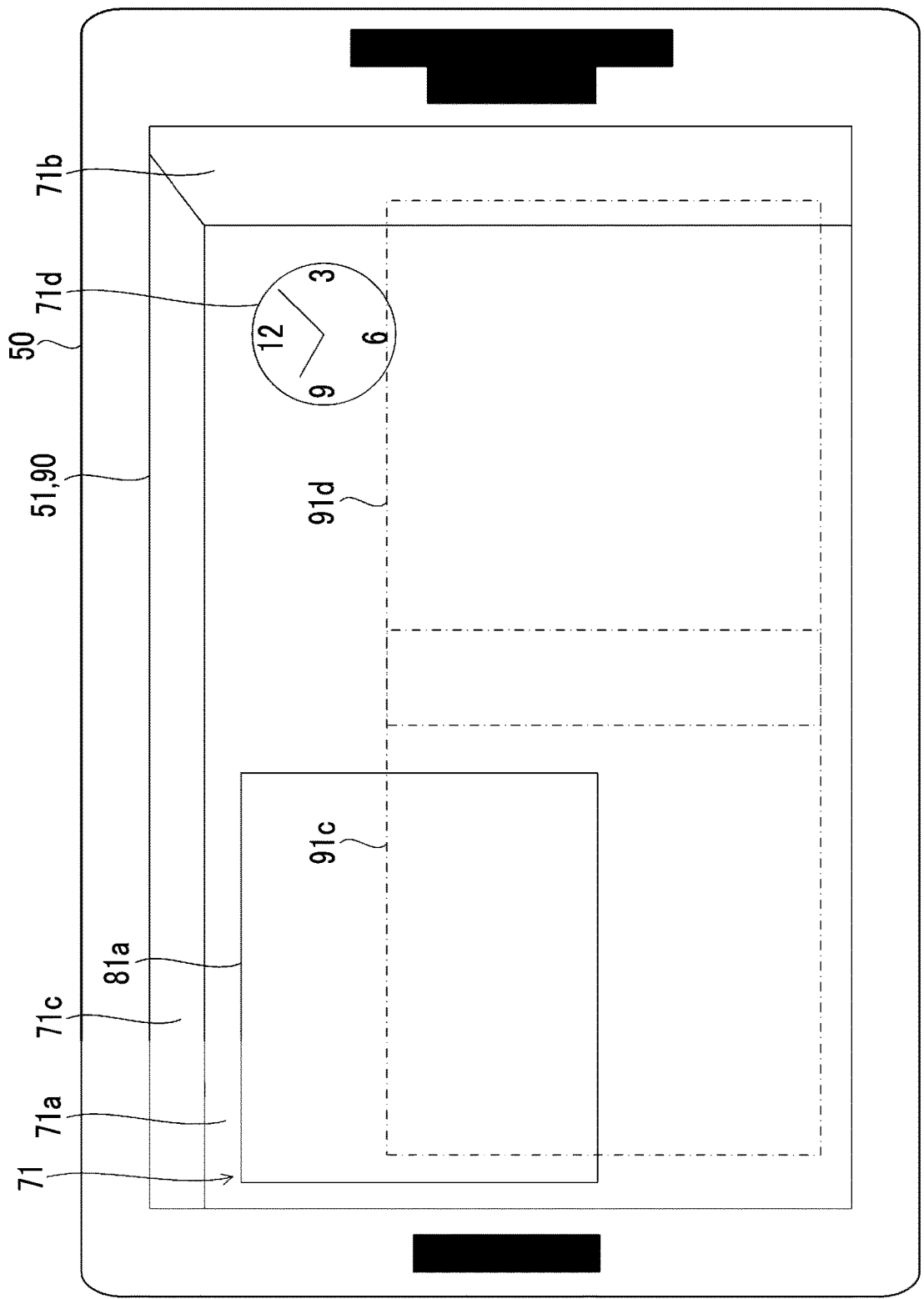
FIG. 14 is a diagram illustrating a first example of supporting installation of the plurality of projection apparatuses via the installation support apparatus 50 of Embodiment 1.

FIG. 14 is a diagram illustrating a first example of supporting installation of the plurality of projection apparatuses via the installation support apparatus 50 of Embodiment 1. For example, based on an input of a projection range 81a to which the first projection apparatus 10a performs projection, the installation support apparatus 50 calculates a first installation range 91c in which the first projection apparatus 10a can be installed in the space 71, and a second installation range 91d in which the second projection apparatus 10b can be installed in the space 71. The first installation range 91c and the second installation range 91d are illustrated in a more simplified manner than the installation range 91.

The first installation range 91c and the second installation range 91d are calculated such that wider-range projection can be performed by the first projection range 11a and by the second projection range 11b in a case where the first projection apparatus 10a is installed anywhere in the first installation range 91c, and where the second projection apparatus 10b is installed anywhere in the second installation range 91d.

The installation support apparatus 50 displays, via the touch panel 51, the installation support image 90 obtained by superimposing images (for example, frame lines) showing the calculated first installation range 91c and the calculated second installation range 91d on the space image 70.

Alternatively, brighter projection can also be performed by superimposing the first projection range 11a and the second projection range 11b such that centers of the first projection range 11a and the second projection range 11b are matched with each other. In this case, the first installation range 91c and the second installation range 91d are calculated such that the centers of the first projection range 11a and the second projection range 11b can be matched with each other in a case where the first projection apparatus 10a is installed anywhere in the first installation range 91c, and where the second projection apparatus 10b is installed anywhere in the second installation range 91d.

Accordingly, the user can intuitively recognize where to install each of the first projection apparatus 10a and the second projection apparatus 10b in the space 71 by inputting the projection range 81a of the first projection apparatus 10a. Thus, installation of the first projection apparatus 10a and of the second projection apparatus 10b can be facilitated.

In a case where the projection range 81a is changed by the user, the installation support apparatus 50 may calculate the first installation range 91c and the second installation range 91d again based on the projection range 81a after the change, and update the images showing the first installation range 91c and the second installation range 91d in the installation support image 90.

Second Example of Supporting Installation of Plurality of Projection Apparatuses Via Installation Support Apparatus 50 of Embodiment 1

Figure 15:
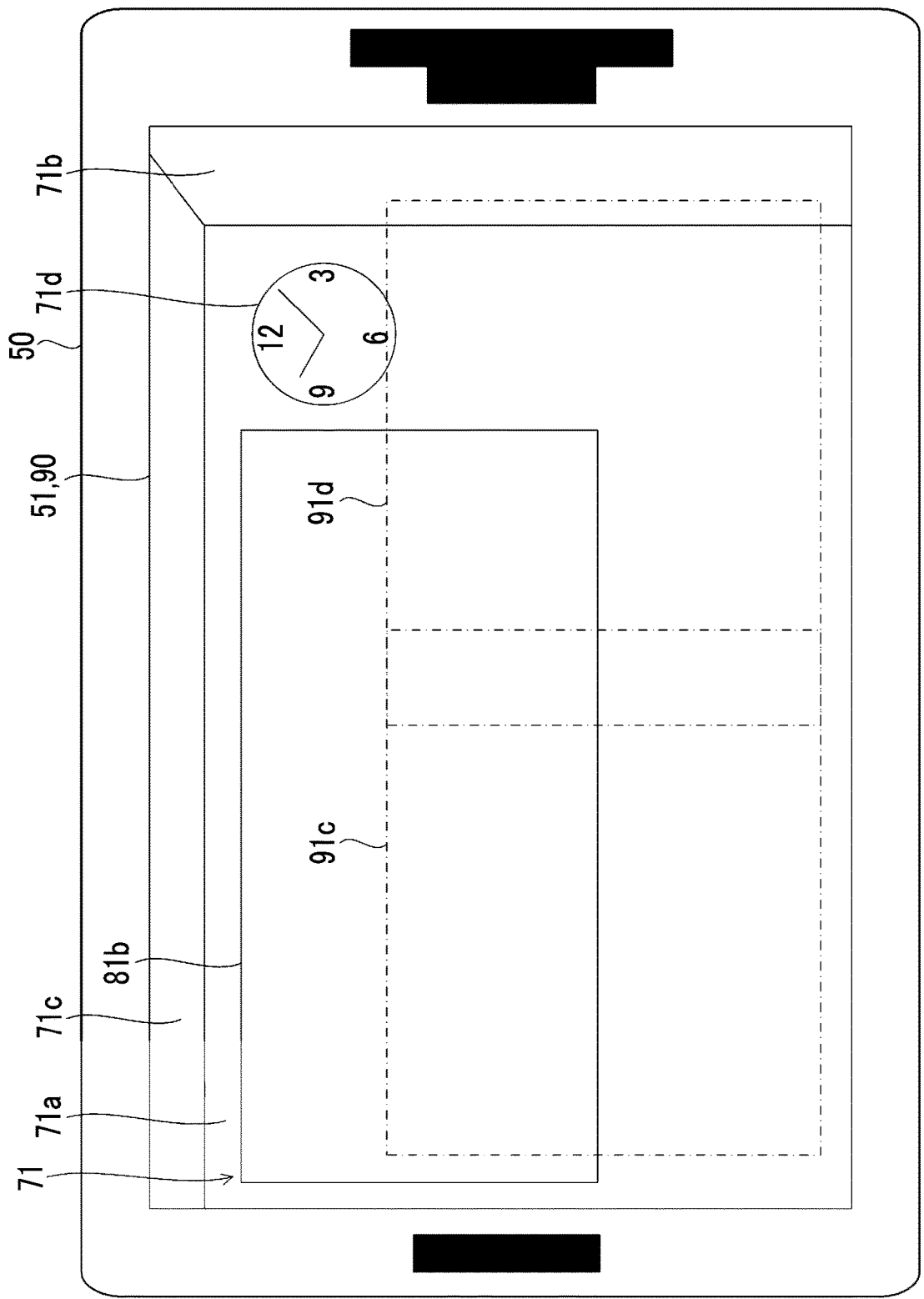
FIG. 15 is a diagram illustrating a second example of supporting installation of the plurality of projection apparatuses via the installation support apparatus 50 of Embodiment 1.

FIG. 15 is a diagram illustrating a second example of supporting installation of the plurality of projection apparatuses via the installation support apparatus 50 of Embodiment 1. For example, based on an input of a projection range 81b obtained by combining a range to which the first projection apparatus 10a performs projection with a range to which the second projection apparatus 10b performs projection, the installation support apparatus 50 calculates the first installation range 91c in which the first projection apparatus 10a can be installed in the space 71, and the second installation range 91d in which the second projection apparatus 10b can be installed in the space 71.

The first installation range 91c and the second installation range 91d are calculated such that projection satisfying the reference can be performed to the projection range 81b in a case where the first projection apparatus 10a is installed anywhere in the first installation range 91c, and where the second projection apparatus 10b is installed anywhere in the second installation range 91d.

The installation support apparatus 50 displays, via the touch panel 51, the installation support image 90 obtained by superimposing the images (for example, frame lines) showing the calculated first installation range 91c and the calculated second installation range 91d on the space image 70.

Accordingly, the user can intuitively recognize where to install each of the first projection apparatus 10a and the second projection apparatus 10b in the space 71 in order to perform projection to the desired projection range 81b. Thus, installation of the first projection apparatus 10a and of the second projection apparatus 10b can be facilitated.

<Processing of Part of Projection Range 81 in Installation Support Image 90 by Installation Support Apparatus 50 of Embodiment 1>

Figure 16:
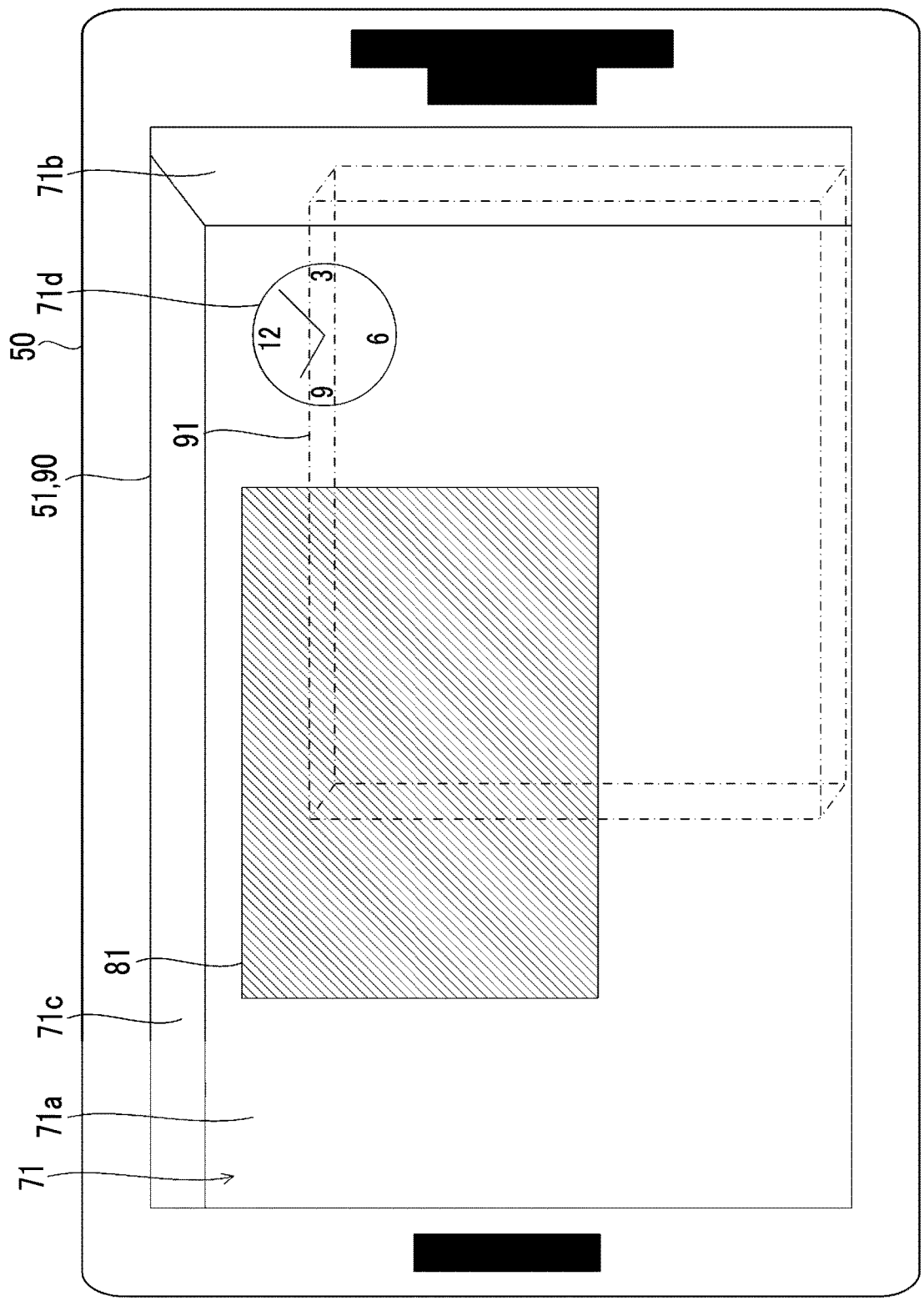
FIG. 16 is a diagram illustrating an example of processing of a part of a projection range 81 in an installation support image 90 by the installation support apparatus 50 of Embodiment 1.

FIG. 16 is a diagram illustrating an example of processing of a part of the projection range 81 in the installation support image 90 by the installation support apparatus 50 of Embodiment 1. The installation support apparatus 50 may display the installation support image 90 obtained by processing a part of the projection range 81 based on attribute information related to visibility of the projection range 81 in the space 71.

For example, the attribute information related to the visibility of the projection range 81 is information related to an actual look such as brightness or a tint of the projection range 81 in the space 71. For example, the attribute information related to the visibility of the projection range 81 can be obtained by imaging of the imaging apparatus comprised as the installation support apparatus 50. Alternatively, the attribute information related to the visibility of the projection range 81 may be input into the installation support apparatus 50 from the outside as the space data indicating the space 71.

For example, the processing is processing of making a change related to a look such as brightness or a tint of a part of the projection range 81 in the installation support image 90. For example, the installation support apparatus 50 estimates the brightness or the tint of the projection image in a case of performing projection via the projection apparatus 10 based on the attribute information, and processes the part of the projection range 81 in the installation support image 90 such that the part has brightness or a tint close to the estimated brightness or the estimated tint.

Accordingly, even without the actual projection apparatus 10, the user can easily perceive visibility of the projection image in the projection range 81 in a case where the projection apparatus 10 is installed, and can easily plan installation of the projection apparatus 10. As the processing, the installation support apparatus 50 may perform processing of superimposing a sample image of projection on a part of the projection range 81 in the installation support image 90.

<Processing Performed by Installation Support Apparatus 50 of Embodiment 1>

Figure 17:
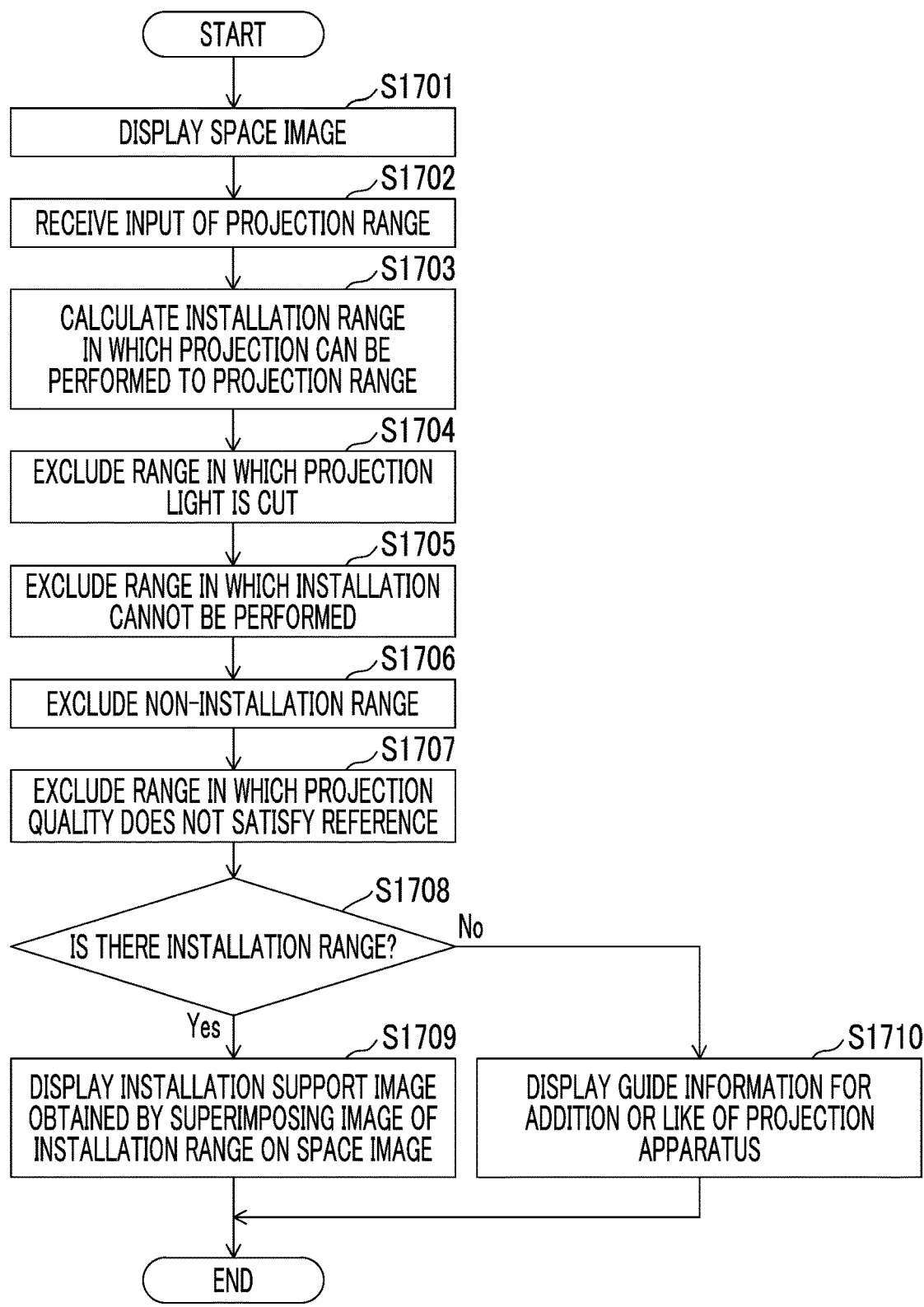
FIG. 17 is a flowchart illustrating an example of processing performed by the installation support apparatus 50 of Embodiment 1.

FIG. 17 is a flowchart illustrating an example of processing performed by the installation support apparatus 50 of Embodiment 1. The installation support apparatus 50 of Embodiment 1 executes, for example, the processing illustrated in FIG. 17. The processing in FIG. 17 is executed by, for example, the processor 61 illustrated in FIG. 6. Here, a case of supporting installation of one projection apparatus 10 will be described.

First, the installation support apparatus 50 displays the space image 70 (step S1701). Next, the installation support apparatus 50 receives the input of the projection range 81 from the user (step S1702). Next, based on the information indicating the specifications of the projection apparatus 10, the installation support apparatus 50 calculates the installation range 91 in which the projection apparatus 10 can perform projection to the input projection range 81 (step S1703).

Next, based on the information indicating the structure of the space 71, the installation support apparatus 50 excludes, from the current installation range 91, a range in which the projection light is cut (step S1704). Next, based on the information indicating the dimension of the projection apparatus 10 and on the information indicating the structure of the space 71, the installation support apparatus 50 excludes, from the current installation range 91, a range in which the projection apparatus 10 cannot be installed in terms of space (step S1705).

Next, the installation support apparatus 50 excludes the non-installation range set by the user from the current installation range 91 (step S1706). Next, based on the information indicating the specifications of the projection apparatus 10, the installation support apparatus 50 excludes, from the current installation range 91, a range in which the projection quality does not satisfy the reference (step S1707).

Next, the installation support apparatus 50 determines whether or not there is an installation range 91 remaining after steps S1704 to S1707 (step S1708). In a case where there is a remaining installation range 91 (step S1708: Yes), the installation support apparatus 50 displays the installation support image 90 obtained by superimposing the installation range 91 on the space image 70 via the touch panel 51 (step S1709), and ends the series of processing. In a case where there is no remaining installation range 91 (step S1708: No), the installation support apparatus 50 displays the guide information 111 for guiding the user to, for example, add the projection apparatus 10 via the touch panel 51 (step S1710), and ends the series of processing.

In the processing illustrated in FIG. 17, at least some of the steps S1704 to S1707 may be omitted in the processing, or steps S1704 to S1707 may be changed in order in the processing.

In such a manner, according to the installation support apparatus 50 of Embodiment 1, it is possible to calculate the installation range 91 in which the projection apparatus 10 can be installed in the space 71 based on the input of the projection range 81 of the projection apparatus 10 in the space 71 (space) in which projection is performed by the projection apparatus 10, and to display the installation support image 90 obtained by superimposing the image showing the calculated installation range 91 on the space image 70 showing the space 71.

Accordingly, the user can intuitively recognize where to install the projection apparatus 10 in the space 71 in order to perform projection to the desired projection range 81. Thus, installation of the projection apparatus 10 can be facilitated. In addition, since the installation support image 90 can be displayed even without the actual projection apparatus 10, installation of the projection apparatus 10 can be easily planned.

Embodiment 2

<Schematic Configuration of Projection Apparatus 10 as Target to be Supported for Installation by Installation Support Apparatus 50 of Embodiment 2>

A target to be supported for installation by the installation support apparatus 50 of Embodiment 2 is the same as the projection apparatus 10 as a target to be supported for installation by the installation support apparatus 50 of Embodiment 1. The installation support apparatus 50 of Embodiment 2 has the same configuration as the installation support apparatus 50 of Embodiment 1 illustrated in FIG. 5 and in FIG. 6.

In addition to the processing of the installation support apparatus 50 of Embodiment 1 or instead of the processing of the installation support apparatus 50 of Embodiment 1, the installation support apparatus 50 of Embodiment 2 performs processing of calculating the projection range of the projection apparatus 10 in the space 71 based on inputs of the installation position of the projection apparatus 10 in the space 71 in which projection is performed by the projection apparatus 10 and projection reference information, and of outputting the installation support image obtained by superimposing an image showing the calculated projection range on the image showing the space 71.

<Supporting Installation of Projection Apparatus 10 Via Installation Support Apparatus 50 of Embodiment 2>

Figure 18:
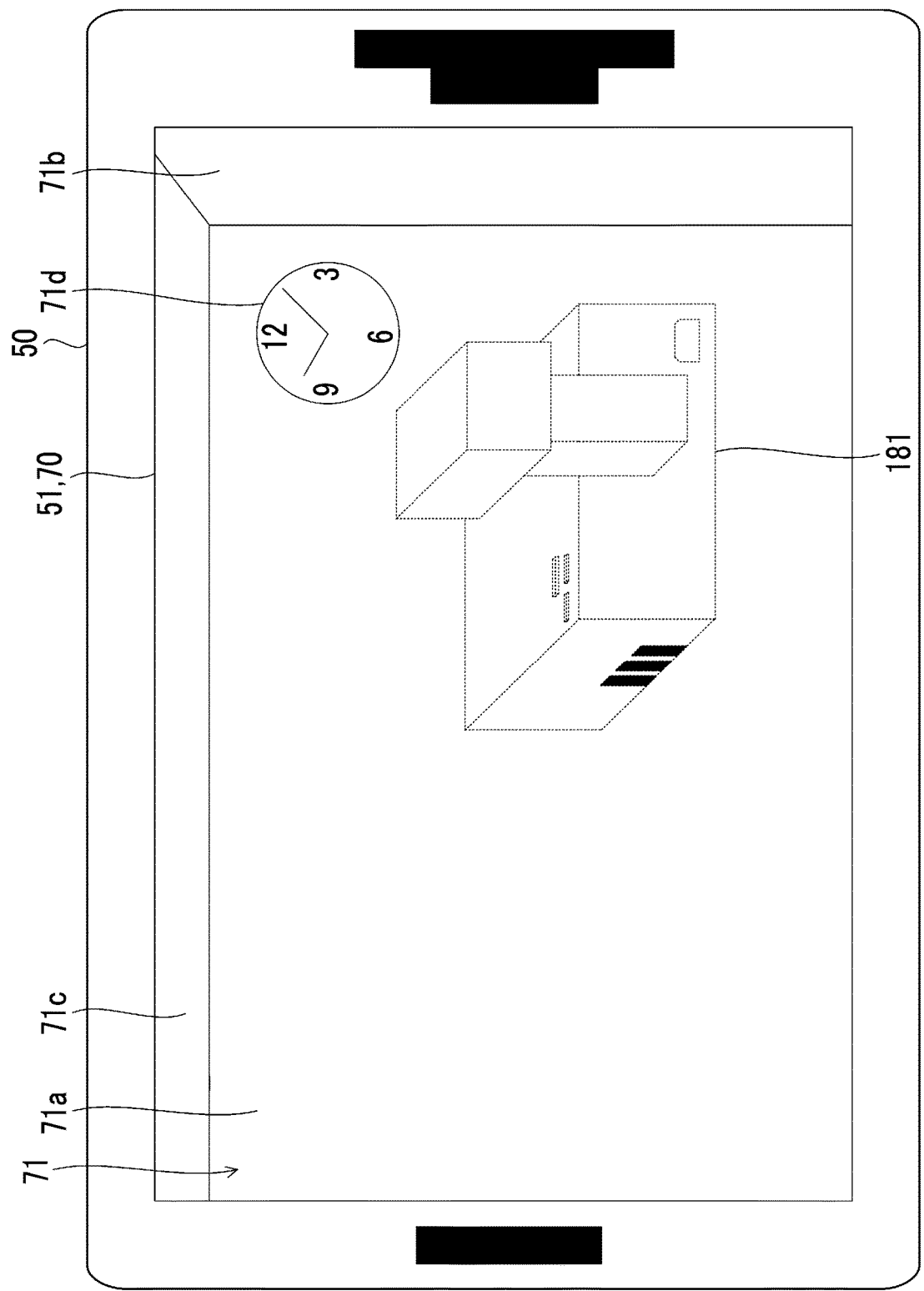
FIG. 18 is a diagram (Part 1) illustrating an example of supporting installation of the projection apparatus 10 via the installation support apparatus 50 of Embodiment 2.
Figure 19:
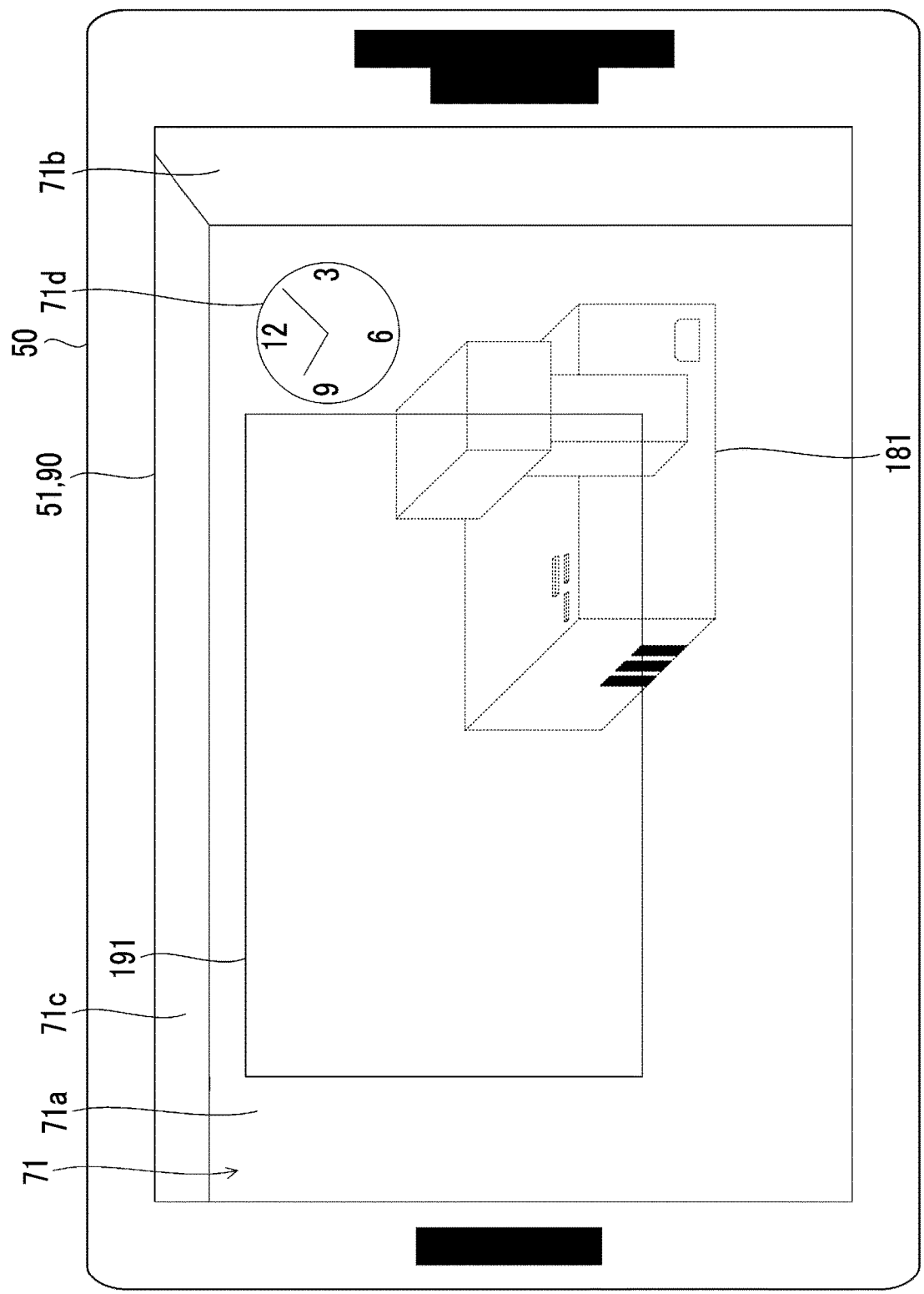
FIG. 19 is a diagram (Part 2) illustrating an example of supporting installation of the projection apparatus 10 via the installation support apparatus 50 of Embodiment 2.

FIG. 18 and FIG. 19 are diagrams illustrating an example of supporting installation of the projection apparatus 10 via the installation support apparatus 50 of Embodiment 2. In the same manner as the processing illustrated in FIG. 7, the installation support apparatus 50 first displays the space image 70 via the touch panel 51. Then, the installation support apparatus 50 receives the inputs of the installation position of the projection apparatus 10 in the space 71 and the projection reference information from the user as illustrated in FIG. 18. The projection reference information is information with which a target to which projection is to be performed by the projection apparatus 10 can be specified. For example, the projection reference information is the projection direction of the projection apparatus 10.

The user designates, via a touch operation or the like, a desired installation position at which the projection apparatus 10 is to be installed in the space image 70 displayed on the touch panel 51. As an example, it is assumed that a desk on which the projection apparatus 10 can be installed is present in the space 71, and that the desk is included in the space image 70 (not illustrated). In a case where the user desires to install the projection apparatus 10 on the desk, the user touches a part on the desk in the space image 70.

For example, the installation support apparatus 50 generates the correspondence information between positional coordinates in the space 71 three-dimensionally recognized by the space recognition sensor comprised as the sensor 65 and positional coordinates in the space image 70 two-dimensionally displayed by the touch panel 51. Then, the installation support apparatus 50, using the correspondence information, converts the installation position designated by the user in the space image 70 displayed on the touch panel 51 into an installation position defined by positional coordinates in the three-dimensionally recognized space 71.

In addition, the user designates the projection direction of the projection apparatus 10 as the projection reference information. For example, the installation support apparatus 50 receives, via a touch operation or the like, an input of any of upper, lower, left, right, front, and rear sides in the space 71 shown by the space image 70 as the projection direction of the projection apparatus 10. Accordingly, the installation support apparatus 50 can receive the inputs of the installation position of the projection apparatus 10 and the projection reference information from the user. In this example, it is assumed that a depth direction in the space 71 shown by the space image 70 is input as the projection direction of the projection apparatus 10.

Based on the input installation position of the projection apparatus 10 and on the projection reference information, the installation support apparatus 50 specifies the target to which projection is to be performed by the projection apparatus 10. For example, the installation support apparatus 50 specifies an object (for example, the wall 71a) present in the projection direction of the projection apparatus 10 from the installation position of the projection apparatus 10 in the space 71 as a target to which projection is to be performed by the projection apparatus 10.

The installation support apparatus 50 may display, via the touch panel 51, a projection apparatus image 181 as the installation support image 90 by superimposing the projection apparatus image 181 on the space image 70. The projection apparatus image 181 is an image showing the projection apparatus 10 and is superimposed on a part corresponding to the input installation position of the projection apparatus 10 in the space image 70. In addition, the projection apparatus image 181 is an image of the projection apparatus 10 in a direction in which projection can be performed in the input projection direction of the projection apparatus 10.

As illustrated in FIG. 19, the installation support apparatus 50 calculates, based on the input installation position of the projection apparatus 10 and on the projection reference information, a projection range 191 to which the projection apparatus 10 can perform projection in the space 71, and displays, via the touch panel 51, an image obtained by superimposing an image (for example, a frame line) showing the calculated projection range 191 on the space image 70 as the installation support image 90.

For example, the installation support apparatus 50, using the correspondence information, converts the calculated projection range 191 into a range defined by two-dimensional positional coordinates in the space image 70 and superimposes an image showing the converted range on the space image 70. Calculation of the projection range 191 based on the installation position of the projection apparatus 10 and on the projection reference information will be described later.

In such a manner, the installation support apparatus 50 calculates, based on the inputs of the installation position of the projection apparatus 10 in the space 71 (space) in which projection is performed by the projection apparatus 10, and the projection reference information, the projection range 191 to which the projection apparatus 10 can perform projection in the space 71, and displays the installation support image 90 obtained by superimposing the image showing the projection range 191 on the space image 70 showing the space 71.

Accordingly, the user can intuitively recognize the range to which the projection apparatus 10 can perform projection in the space 71 with the desired installation position of the projection apparatus 10. Thus, installation of the projection apparatus 10 can be facilitated. In addition, since the installation support image 90 can be displayed even without the actual projection apparatus 10, installation of the projection apparatus 10 can be easily planned.

The projection reference information is not limited to the projection direction of the projection apparatus 10 and may be information with which a target that is intended by the user and to which projection is to be performed by the projection apparatus 10 can be specified. For example, the projection reference information may be information that directly indicates the target (for example, the wall 71a) to which projection is to be performed by the projection apparatus 10. For example, the user performs an operation of touching a part of the target to which projection is to be performed (for example, a part of the wall 71a) in the displayed space image 70. The installation support apparatus 50, using the correspondence information, converts a position touched by the user in the space image 70 into a position defined by positional coordinates in the three-dimensionally recognized space 71 and specifies an object (for example, the wall 71a) present at the position in the space 71 as a target to which projection is to be performed by the projection apparatus 10.

In addition, the projection reference information may be information indicating a target that is not present in the space 71 and to which projection is to be performed. For example, in a case where a screen is disposed in front of the wall 71a, and projection is to be performed to the screen by the projection apparatus 10, the user inputs, as the projection reference information, information with which a position of the screen can be specified, into the installation support apparatus 50 as the projection reference information.

In addition, in a case where the imaging range has changed, that is, the range of the space 71 shown by the space image 70 has changed, because of movement of the installation support apparatus 50 or of a change in the direction of the installation support apparatus 50, the installation support apparatus 50 may calculate a range to which the projection range 191 corresponds in the space image 70 again, and update the image of the projection range 191 in the installation support image 90. Accordingly, the user can more intuitively recognize the projection range 191 in the space 71 by moving the installation support apparatus 50 or by changing the direction of the installation support apparatus 50. Thus, installation of the projection apparatus 10 can be further facilitated.

<Calculation of Projection Range 191 Based on Structure of Space 71>

For example, the installation support apparatus 50 calculates the projection range 191 based on the installation position of the projection apparatus 10, the projection reference information, and the information indicating the structure of the space 71.

For example, the installation support apparatus 50 calculates, as a projection center, a position closest to the installation position of the projection apparatus 10 in the target (for example, the wall 71a) that is specified by the projection reference information and to which projection is to be performed by the projection apparatus 10, and calculates the projection range 191 having a rectangular shape centered at the calculated projection center. Accordingly, the projection range 191 in a case of performing projection without shifting or without changing the projection direction can be calculated.

In such a manner, by calculating the projection range 191 based on the installation position of the projection apparatus 10, the projection reference information, and the information indicating the structure of the space 71, the installation support apparatus 50 can calculate, in accordance with the structure of the space 71, the projection range 191 to which projection can be performed with respect to the installation position of the projection apparatus 10.

<Calculation of Projection Range 191 Based on Specifications of Projection Apparatus 10>

The installation support apparatus 50 may calculate a size and a shape of the projection range 191 in the target to which projection is to be performed, based on a distance between the target, which is specified by the projection reference information and to which projection is to be performed by the projection apparatus 10, and the installation position of the projection apparatus 10, an angle of view of projection of the projection apparatus 10, and an aspect ratio of projection of the projection apparatus 10. Then, the installation support apparatus 50 calculates, as the projection range 191, a rectangular range that is centered at the projection center and that has the calculated size and the calculated aspect ratio.

In addition, the installation support apparatus 50 may perform processing of calculating a projectable range obtained by expanding the projection range 191 based on the range in which the projection range 11 of the projection apparatus 10 can be shifted, and on the range in which the projection direction of the projection apparatus 10 can be changed. For example, this processing is performed based on the information indicating the specifications of the shift mechanism or the specifications of the projection direction changing mechanism 104 of the projection apparatus 10. In this case, the installation support apparatus 50 may display images showing the projection range 191 and the projectable range, respectively, by superimposing the images on the installation support image 90. Accordingly, the user can easily perceive the projection range 191 to which projection can be performed without shifting or without changing the projection direction, and the projectable range to which projection can be performed by shifting or by changing the projection direction.

In such a manner, by calculating the projection range 191 based on the information indicating the specifications of the projection apparatus 10, the installation support apparatus 50 can calculate and display the appropriate projection range 191 corresponding to the specifications of the projection apparatus 10 without the actual projection apparatus 10. In addition, the installation support apparatus 50 can calculate, based on information indicating specifications related to an operation of moving the projection range 11 (shifting or changing of the projection direction), a projectable range to which projection can be performed by performing the operation of moving the projection range 11, and display the projectable range.

<Calculation of Projection Range 191 Based on Non-Installation Range of Projection Apparatus 10>

The installation support apparatus 50 may cause the non-installation range of the projection apparatus 10 in the space 71 to be not inputtable as the installation position of the projection apparatus 10 by the user. In such a manner, by restricting the inputtable installation position of the projection apparatus 10 based on the non-installation range of the projection apparatus 10 in the space 71, the installation support apparatus 50 can cause the non-installation range of the projection apparatus 10 set by the user in accordance with various matters to be not settable as the installation position of the projection apparatus 10.

<Calculation of Projection Range 191 in which Projection Quality of Projection Apparatus 10 is Satisfied>

The installation support apparatus 50 may calculate the projection range 191 in which the projection quality of the image projected to the projection range 81 from the projection apparatus 10 satisfies the reference. For example, in a case where the angle of view of the projection apparatus 10 can be changed, increasing the angle of view of the projection apparatus 10 decreases the resolution or brightness of the projection image.

Thus, the installation support apparatus 50 may perform processing of excluding, from the projection range 191, a projection range that is based on an angle of view in which the resolution or brightness of the projection image is less than a predetermined reference.

In such a manner, by calculating the projection range 191 in which the projection quality of the image projected to the projection range 81 from the projection apparatus 10 satisfies the reference, the installation support apparatus 50 can facilitate installation of the projection apparatus 10 of which the projection quality satisfies the reference.

<Display of Guide Information by Installation Support Apparatus 50 of Embodiment 2>

Figure 20:
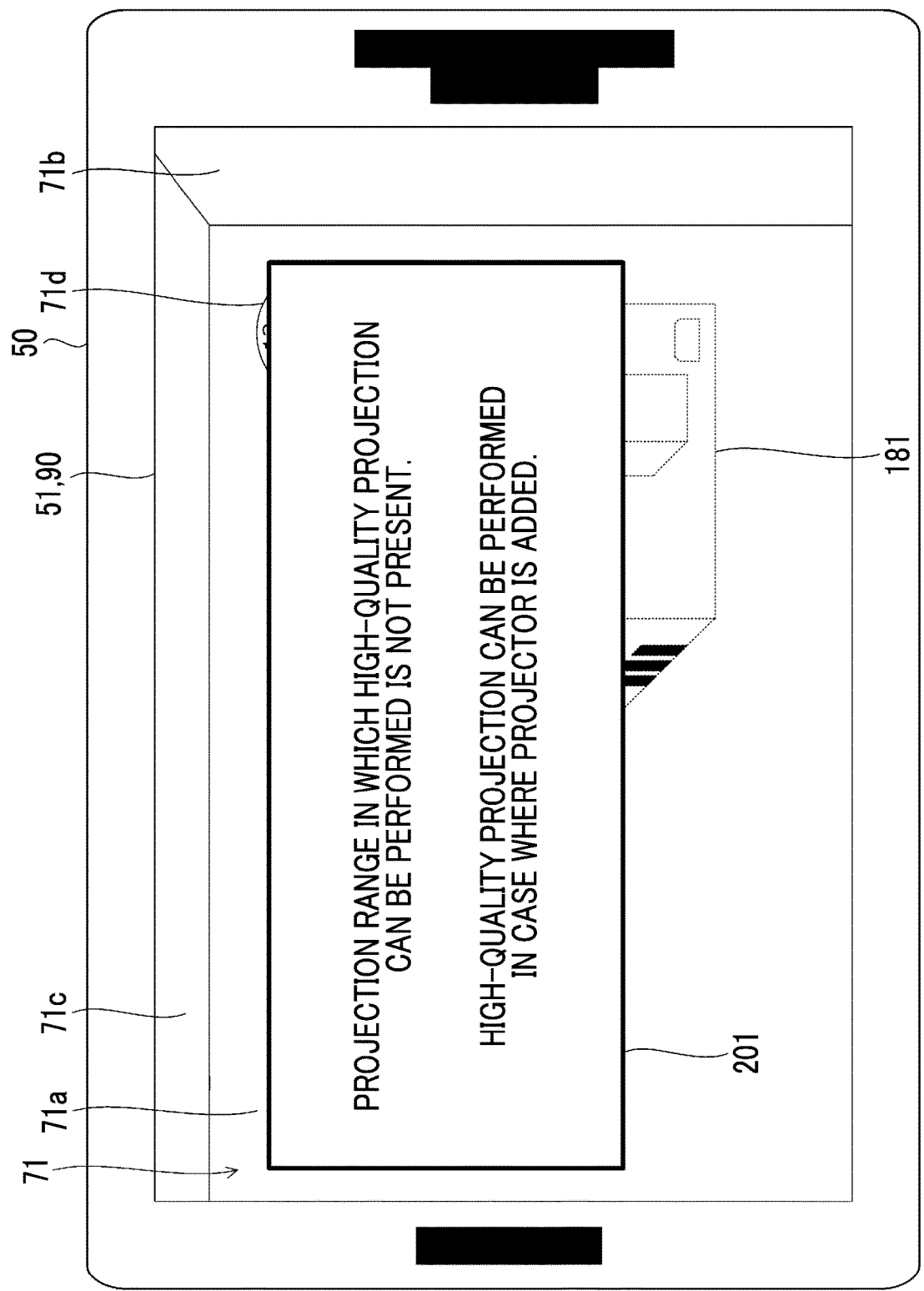
FIG. 20 is a diagram illustrating an example of display of guide information by the installation support apparatus 50 of Embodiment 2.

FIG. 20 is a diagram illustrating an example of display of guide information by the installation support apparatus 50 of Embodiment 2. In a case where the projection range 191 in which the projection quality of the image projected to the projection range 81 from the projection apparatus 10 satisfies the reference is not present, the installation support apparatus 50 may display the installation support image 90 including information that prompts at least any of addition or changing of the projection apparatus 10.

As an example, the installation support apparatus 50 may display the installation support image 90 including guide information 201 instead of the projection range 191 via the touch panel 51 as illustrated in FIG. 20. The guide information 201 includes a message indicating that the projection range 191 in which high-quality projection can be performed is not present, and a message indicating that high-quality projection can be performed in a case where a projector (projection apparatus 10) is added.

<Plurality of Projection Apparatuses as Target to be Supported for Installation by Installation Support Apparatus 50 of Embodiment 2>

In the same manner as the installation support apparatus 50 of Embodiment 1, the installation support apparatus 50 of Embodiment 2, for example, may display the installation support image 90 for supporting installation of the first projection apparatus 10a and of the second projection apparatus 10b illustrated in FIG. 13.

<Supporting Installation of Plurality of Projection Apparatuses Via Installation Support Apparatus 50 of Embodiment 2>

Figure 21:
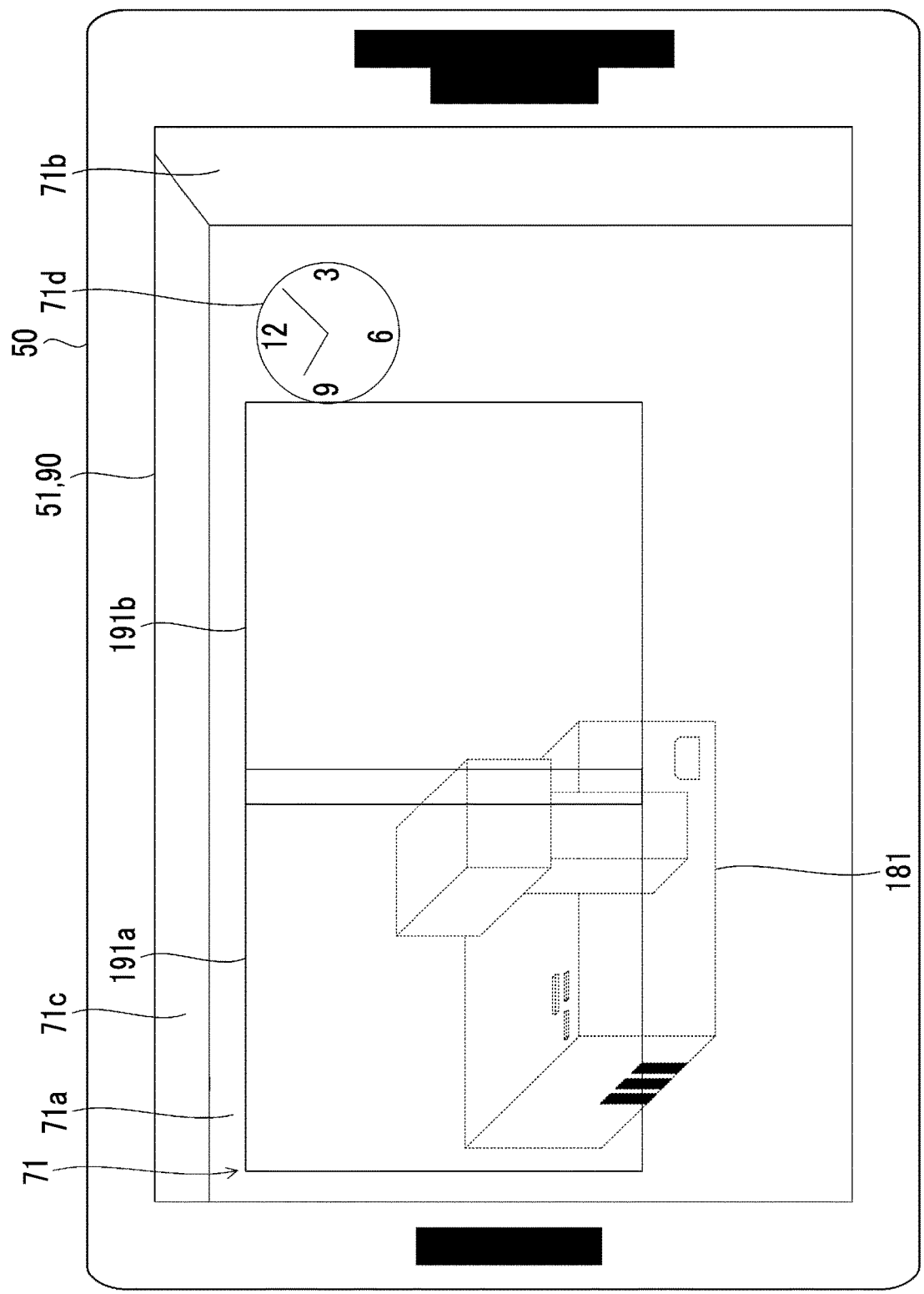
FIG. 21 is a diagram illustrating an example of supporting installation of a plurality of projection apparatuses via the installation support apparatus 50 of Embodiment 2.

FIG. 21 is a diagram illustrating an example of supporting installation of a plurality of projection apparatuses via the installation support apparatus 50 of Embodiment 2. For example, based on inputs of an installation position of the first projection apparatus 10a and the projection reference information, the installation support apparatus 50 calculates a first projection range 191a to which the first projection apparatus 10a can perform projection in the space 71, and a second projection range 191b to which the second projection apparatus 10b can perform projection in the space 71. The first projection range 191a and the second projection range 191b are illustrated in a more simplified manner than the projection range 191.

For example, the first projection range 191a and the second projection range 191b are calculated such that an installation position of the second projection apparatus 10b at which projection can be performed to the second projection range 191b is present in the space 71 in a case where the first projection apparatus 10a is installed at the input installation position of the first projection apparatus 10a.

The installation support apparatus 50 displays, via the touch panel 51, the installation support image 90 obtained by superimposing images (for example, frame lines) showing the calculated first projection range 191a and the calculated second projection range 191b on the space image 70.

Accordingly, the user can intuitively recognize how projection ranges of the first projection apparatus 10a and of the second projection apparatus 10b will be by inputting the installation position of the first projection apparatus 10a and the projection reference information. Thus, planning of installation of the first projection apparatus 10a and of the second projection apparatus 10b can be facilitated.

In a case where the installation position of the first projection apparatus 10a and the projection reference information are changed by the user, the installation support apparatus 50 calculates the first projection range 191a and the second projection range 191b again based on the installation position of the first projection apparatus 10a and on the projection reference information after the change, and updates the images showing the first projection range 191a and the second projection range 191b in the installation support image 90.

<Processing of Part of Projection Range 191 in Installation Support Image 90 by Installation Support Apparatus 50 of Embodiment 2>

Figure 22:
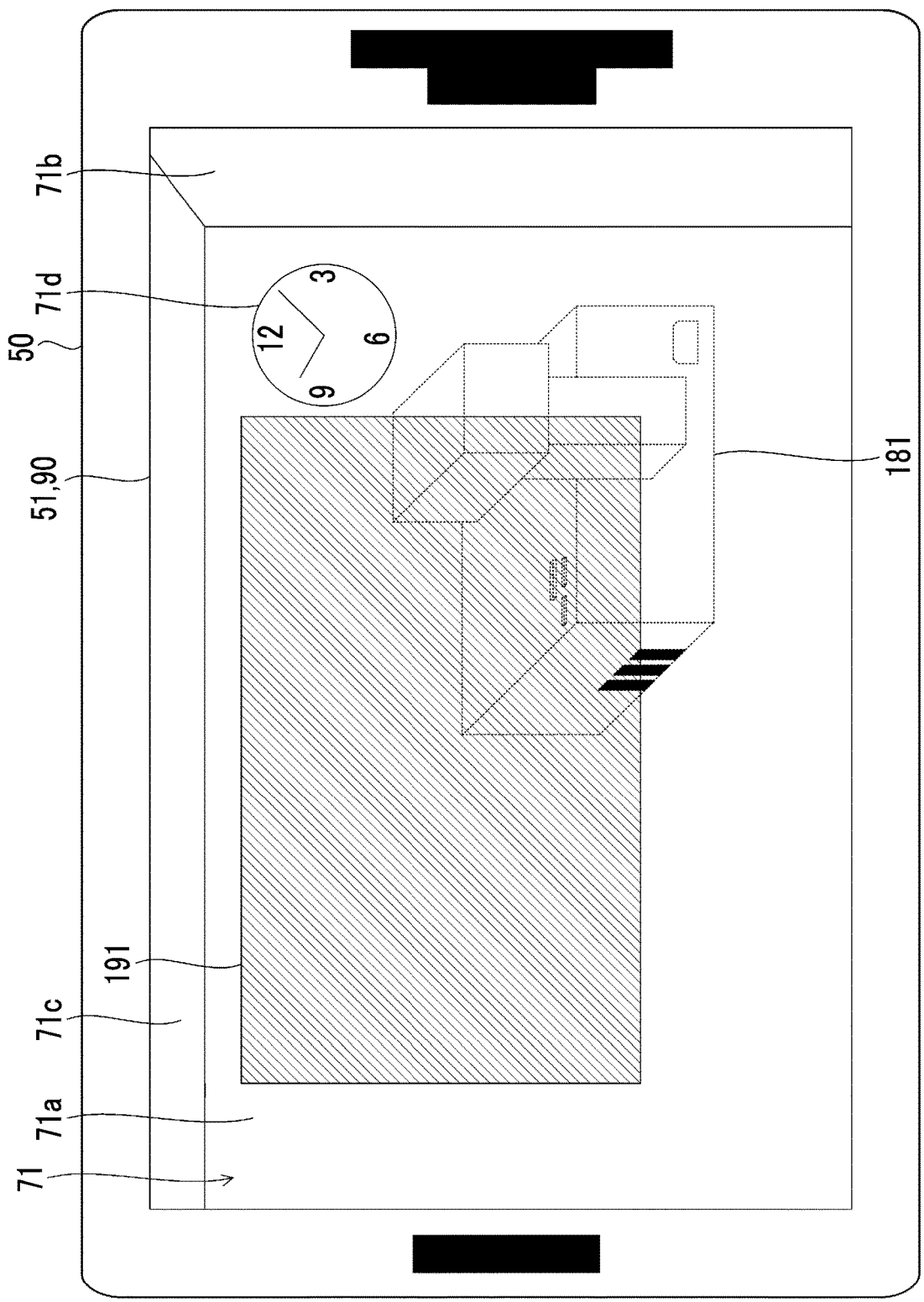
FIG. 22 is a diagram illustrating an example of processing of a part of a projection range 191 in the installation support image 90 by the installation support apparatus 50 of Embodiment 2.

FIG. 22 is a diagram illustrating an example of processing of a part of the projection range 191 in the installation support image 90 by the installation support apparatus 50 of Embodiment 2. The installation support apparatus 50 may display the installation support image 90 obtained by processing a part of the projection range 191 based on attribute information related to visibility of the projection range 191 in the space 71.

For example, the attribute information related to the visibility of the projection range 191 is information related to an actual look such as brightness or a tint of the projection range 191 in the space 71. For example, the attribute information related to the visibility of the projection range 191 can be obtained by imaging of the imaging apparatus comprised as the installation support apparatus 50. Alternatively, the attribute information related to the visibility of the projection range 191 may be input into the installation support apparatus 50 from the outside as the space data indicating the space 71.

For example, the processing is processing of making a change related to a look such as brightness or a tint of a part of the projection range 191 in the installation support image 90. For example, the installation support apparatus 50 estimates the brightness or the tint of the projection image in a case of performing projection via the projection apparatus 10 based on the attribute information, and processes the part of the projection range 191 in the installation support image 90 such that the part has brightness or a tint close to the estimated brightness or the estimated tint.

Accordingly, even without the actual projection apparatus 10, the user can easily perceive visibility of the projection image in the projection range 191 in a case where the projection apparatus 10 is installed, and can easily plan installation of the projection apparatus 10. As the processing, the installation support apparatus 50 may perform processing of superimposing a sample image of projection on a part of the projection range 191 in the installation support image 90.

<Processing Performed by Installation Support Apparatus 50 of Embodiment 2>

Figure 23:
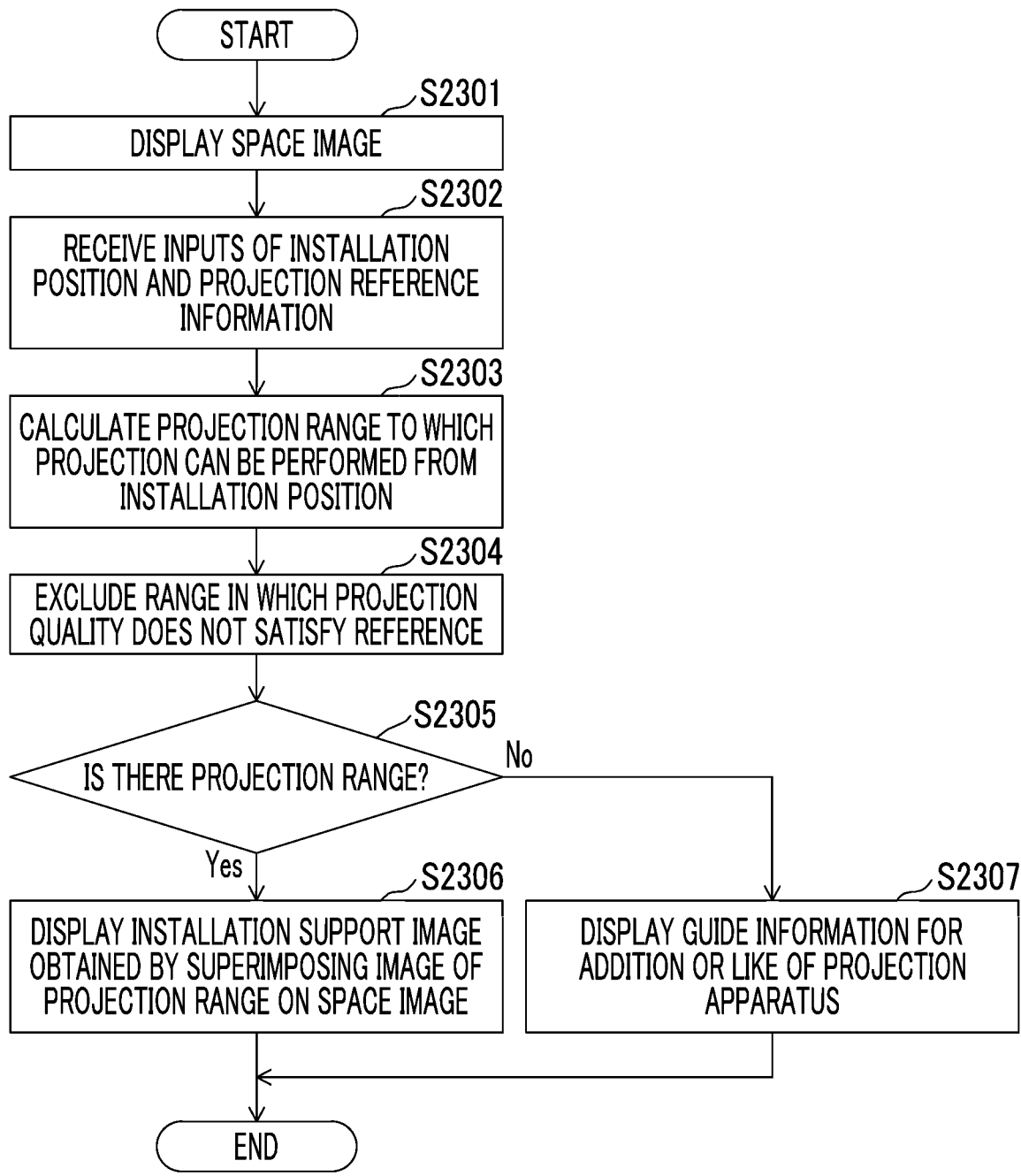
FIG. 23 is a flowchart illustrating an example of processing performed by the installation support apparatus 50 of Embodiment 2.

FIG. 23 is a flowchart illustrating an example of processing performed by the installation support apparatus 50 of Embodiment 2. The installation support apparatus 50 of Embodiment 2 executes, for example, the processing illustrated in FIG. 23. The processing in FIG. 23 is executed by, for example, the processor 61 illustrated in FIG. 6. Here, a case of supporting installation of one projection apparatus 10 will be described.

First, the installation support apparatus 50 displays the space image 70 (step S2301). Next, the installation support apparatus 50 receives the inputs of the installation position of the projection apparatus 10 and the projection reference information from the user (step S2302). At this point, the installation support apparatus 50 may restrict an inputtable installation position of the projection apparatus 10 to exclude the non-installation range.

Next, the installation support apparatus 50 calculates, based on the information indicating the specifications of the projection apparatus 10, the projection range 191 to which the projection apparatus 10 can perform projection in the target, which is specified by the projection reference information and to which projection is to be performed, from the input installation position of the projection apparatus 10 (step S2303). At this point, the installation support apparatus 50 may further calculate the projectable range to which projection can be performed by shifting or by changing the projection direction. Next, based on the information indicating the specifications of the projection apparatus 10, the installation support apparatus 50 excludes, from the current projection range 191, a range in which the projection quality does not satisfy the reference (step S2304).

Next, the installation support apparatus 50 determines whether or not there is a projection range 191 remaining after step S2304 (step S2305). In a case where there is a remaining projection range 191 (step S2305: Yes), the installation support apparatus 50 displays the installation support image 90 obtained by superimposing the image of the projection range 191 on the space image 70 via the touch panel 51 (step S2306), and ends the series of processing. In a case where the projectable range is also calculated in step S2303, the installation support apparatus 50 displays the installation support image 90 obtained by superimposing images of the projection range 191 and of the projectable range on the space image 70 via the touch panel 51 in step S2306. In a case where there is no remaining projection range 191 (step S2305: No), the installation support apparatus 50 displays the guide information 201 for guiding to perform addition or the like of the projection apparatus 10 via the touch panel 51 (step S2307), and ends the series of processing.

In the processing illustrated in FIG. 23, for example, step S2304 may be omitted in the processing.

In such a manner, according to the installation support apparatus 50 of Embodiment 2, it is possible to calculate the projection range 191 of the projection apparatus 10 in the space 71 based on the inputs of the installation position of the projection apparatus 10 in the space 71 in which projection is performed by the projection apparatus 10, and the projection reference information, and to display the installation support image 90 obtained by superimposing the image showing the calculated projection range 191 on the space image 70 showing the space 71.

Accordingly, the user can intuitively recognize the range to which the projection apparatus 10 can perform projection in the space 71 with the desired installation position of the projection apparatus 10 and with the projection reference information. Thus, installation of the projection apparatus 10 can be facilitated. In addition, since the installation support image 90 can be displayed even without the actual projection apparatus 10, installation of the projection apparatus 10 can be easily planned.

MODIFICATION EXAMPLES

Modification examples related to each embodiment will be described.

Modification Example 1

While a case where the space image 70 showing the space 71 is a live preview image showing the image obtained by imaging of the imaging apparatus comprised in the installation support apparatus 50 in real time has been described, the space image 70 is not limited thereto. For example, the space image 70 may be a still image obtained by imaging the space 71 in the past. In addition, the space image 70 may not be an image obtained by imaging and may be, for example, an image generated based on three-dimensional data indicating the structure of the space 71.

Modification Example 2

While a case where the installation support apparatus 50 is a tablet terminal including the touch panel 51 has been described, the installation support apparatus 50 is not limited to such a configuration. For example, the installation support apparatus 50 may be an information terminal such as a smartphone or a personal computer.

Modification Example 3

While a configuration in which the installation support apparatus 50 displays the installation support image 90 has been described, the installation support apparatus 50 may control other apparatuses to display the installation support image 90 by transmitting the generated installation support image 90 to the other apparatuses. In this case, the installation support apparatus 50 may be a server apparatus or the like not comprising a display device.

The embodiments and the modification examples can be implemented in combination with each other.

At least the following matters are disclosed in the present specification.

(1)

An installation support apparatus that supports installation of a projection apparatus, the installation support apparatus comprising a processor, in which the processor is configured to, based on an input of a projection range of the projection apparatus in a space in which projection is performed by the projection apparatus, calculate an installation range in which the projection apparatus is installable in the space, and output an installation support image obtained by superimposing an image showing the calculated installation range on an image showing the space.

2)

The installation support apparatus according to (1), in which the processor is configured to calculate the installation range based on the projection range and on information indicating a structure of the space.

(3)

The installation support apparatus according to (1) or (2), in which the processor is configured to calculate the installation range based on the projection range and on information indicating specifications of the projection apparatus.

(4)

The installation support apparatus according to any one of (1) to (3), in which the processor is configured to calculate the installation range based on the projection range and on information indicating a non-installation range of the projection apparatus in the space.

(5)

The installation support apparatus according to any one of (1) to (4), in which the processor is configured to calculate the installation range in which projection quality of an image projected to the projection range from the projection apparatus satisfies a reference.

(6)

The installation support apparatus according to (5), in which the processor is configured to, in a case where the installation range in which the projection quality satisfies the reference is not present, output the installation support image including information that prompts addition or changing of the projection apparatus.

(7)

The installation support apparatus according to any one of (1) to (6), in which the processor is configured to, in a case where an image is projectable to the projection range from the projection apparatus with a plurality of types of projection quality, calculate, for each of the plurality of types of projection quality, the installation range in which the projection apparatus is installable in the space, and output the installation support image obtained by superimposing the image showing the calculated installation range for each of the plurality of types of projection quality on the image showing the space.

(8)

The installation support apparatus according to any one of (1) to (7), in which installation of a first projection apparatus that is the projection apparatus, and of a second projection apparatus different from the first projection apparatus is supported, and the processor is configured to, based on an input of a projection range of the first projection apparatus in the space, calculate a first installation range in which the first projection apparatus is installable in the space, and a second installation range in which the second projection apparatus is installable in the space, and output the installation support image obtained by superimposing images showing the calculated first installation range and the calculated second installation range on the image showing the space.

(9)

The installation support apparatus according to any one of (1) to (8), in which installation of a first projection apparatus that is the projection apparatus, and of a second projection apparatus different from the first projection apparatus is supported, and the processor is configured to, based on an input of a projection range obtained by combining a range to which the first projection apparatus performs projection with a range to which the second projection apparatus performs projection in the space, calculate a first installation range in which the first projection apparatus is installable in the space, and a second installation range in which the second projection apparatus is installable in the space, and output the installation support image obtained by superimposing images showing the calculated first installation range and the calculated second installation range on the image showing the space.

(10)

The installation support apparatus according to any one of (1) to (9), in which the processor is configured to, based on attribute information related to visibility of the projection range in the space, output the installation support image obtained by processing a part of the projection range.

(11)

An installation support method of supporting installation of a projection apparatus, the installation support method comprising, via a processor, calculating, based on an input of a projection range of the projection apparatus in a space in which projection is performed by the projection apparatus, an installation range in which the projection apparatus is installable in the space, and outputting an installation support image obtained by superimposing an image showing the calculated installation range on an image showing the space.

(12)

The installation support method according to (11), in which the processor is configured to calculate the installation range based on the projection range and on information indicating a structure of the space.

(13)

The installation support method according to (11) or (12), in which the processor is configured to calculate the installation range based on the projection range and on information indicating specifications of the projection apparatus.

(14)

The installation support method according to any one of (11) to (13), in which the processor is configured to calculate the installation range based on the projection range and on information indicating a non-installation range of the projection apparatus in the space.

(15)

The installation support method according to any one of (11) to (14), in which the processor is configured to calculate the installation range in which projection quality of an image projected to the projection range from the projection apparatus satisfies a reference.

(16)

The installation support method according to (15), in which the processor is configured to, in a case where the installation range in which the projection quality satisfies the reference is not present, output the installation support image including information that prompts addition or changing of the projection apparatus.

(17)

The installation support method according to any one of (11) to (16), in which the processor is configured to, in a case where an image is projectable to the projection range from the projection apparatus with a plurality of types of projection quality, calculate, for each of the plurality of types of projection quality, the installation range in which the projection apparatus is installable in the space, and output the installation support image obtained by superimposing the image showing the calculated installation range for each of the plurality of types of projection quality on the image showing the space.

(18)

The installation support method according to any one of (11) to (17), in which installation of a first projection apparatus that is the projection apparatus, and of a second projection apparatus different from the first projection apparatus is supported, and the processor is configured to, based on an input of a projection range of the first projection apparatus in the space, calculate a first installation range in which the first projection apparatus is installable in the space, and a second installation range in which the second projection apparatus is installable in the space, and output the installation support image obtained by superimposing images showing the calculated first installation range and the calculated second installation range on the image showing the space.

(19)

The installation support method according to any one of (11) to (18), in which installation of a first projection apparatus that is the projection apparatus, and of a second projection apparatus different from the first projection apparatus is supported, and the processor is configured to, based on an input of a projection range obtained by combining a range to which the first projection apparatus performs projection with a range to which the second projection apparatus performs projection in the space, calculate a first installation range in which the first projection apparatus is installable in the space, and a second installation range in which the second projection apparatus is installable in the space, and output the installation support image obtained by superimposing images showing the calculated first installation range and the calculated second installation range on the image showing the space.

(20)

The installation support method according to any one of (11) to (19), in which the processor is configured to, based on attribute information related to visibility of the projection range in the space, output the installation support image obtained by processing a part of the projection range.

(21)

An installation support program for supporting installation of a projection apparatus, the installation support program causing a processor to execute a process comprising calculating, based on an input of a projection range of the projection apparatus in a space in which projection is performed by the projection apparatus, an installation range in which the projection apparatus is installable in the space, and outputting an installation support image obtained by superimposing an image showing the calculated installation range on an image showing the space.

(22)

An installation support apparatus that supports installation of a projection apparatus, the installation support apparatus comprising a processor, in which the processor is configured to, based on inputs of an installation position of the projection apparatus in a space in which projection is performed by the projection apparatus, and projection reference information, calculate a projection range of the projection apparatus in the space, and output an installation support image obtained by superimposing an image showing the calculated projection range on an image showing the space.

(23)

The installation support apparatus according to (22), in which the processor is configured to calculate the projection range based on the installation position of the projection apparatus and on information indicating a structure of the space.

(24)

The installation support apparatus according to (22) or (23), in which the processor is configured to calculate the projection range based on the installation position of the projection apparatus and on information indicating specifications of the projection apparatus.

(25)

The installation support apparatus according to any one of (22) to (24), in which the processor is configured to restrict an inputtable installation position of the projection apparatus based on information indicating a non-installation range of the projection apparatus in the space.

(26)

The installation support apparatus according to any one of (22) to (25), in which the processor is configured to calculate the projection range in which projection quality of an image projected to the projection range from the projection apparatus satisfies a reference.

(27)

The installation support apparatus according to (26), in which the processor is configured to, in a case where the projection quality does not satisfy the reference with a designated installation position of the projection apparatus, output the installation support image including information that prompts movement, addition, or changing of the projection apparatus.

(28)

The installation support apparatus according to any one of (22) to (27), in which installation of a first projection apparatus that is the projection apparatus, and of a second projection apparatus different from the first projection apparatus is supported, and the processor is configured to, based on an installation position of the first projection apparatus in the space and on a designation of a projection reference position, calculate a first projection range to which the first projection apparatus is capable of performing projection in the space, and a second projection range to which the second projection apparatus is capable of performing projection in the space, and output the installation support image obtained by superimposing images showing the calculated first projection range and the calculated second projection range on the image showing the space.

(29)

The installation support apparatus according to any one of (22) to (28), in which the processor is configured to, based on attribute information related to visibility of the projection range in the space, output the installation support image obtained by processing a part of the projection range.

(30)

An installation support method of supporting installation of a projection apparatus, the installation support method comprising, via a processor, calculating, based on inputs of an installation position of the projection apparatus in a space in which projection is performed by the projection apparatus, and projection reference information, a projection range of the projection apparatus in the space, and outputting an installation support image obtained by superimposing an image showing the calculated projection range on an image showing the space.

(31)

The installation support method according to (30), in which the processor is configured to calculate the projection range based on the installation position of the projection apparatus and on information indicating a structure of the space.

(32)

The installation support method according to (30) or (31), in which the processor is configured to calculate the projection range based on the installation position of the projection apparatus and on information indicating specifications of the projection apparatus.

(33)

The installation support method according to any one of (30) to (32), in which the processor is configured to restrict an inputtable installation position of the projection apparatus based on information indicating a non-installation range of the projection apparatus in the space.

(34)

The installation support method according to any one of (30) to (33), in which the processor is configured to calculate the projection range in which projection quality of an image projected to the projection range from the projection apparatus satisfies a reference.

(35)

The installation support method according to (34), in which the processor is configured to, in a case where the projection quality does not satisfy the reference with a designated installation position of the projection apparatus, output the installation support image including information that prompts movement, addition, or changing of the projection apparatus.

(36)

The installation support method according to any one of (30) to (35), in which installation of a first projection apparatus that is the projection apparatus, and of a second projection apparatus different from the first projection apparatus is supported, and the processor is configured to, based on an installation position of the first projection apparatus in the space and on a designation of a projection reference position, calculate a first projection range to which the first projection apparatus is capable of performing projection in the space, and a second projection range to which the second projection apparatus is capable of performing projection in the space, and output the installation support image obtained by superimposing images showing the calculated first projection range and the calculated second projection range on the image showing the space.

(37) The installation support method according to any one of (30) to (36), in which the processor is configured to, based on attribute information related to visibility of the projection range in the space, output the installation support image obtained by processing a part of the projection range.

(38) An installation support program for supporting installation of a projection apparatus, the installation support program causing a processor to execute a process comprising calculating, based on inputs of an installation position of the projection apparatus in a space in which projection is performed by the projection apparatus, and projection reference information, a projection range of the projection apparatus in the space, and outputting an installation support image obtained by superimposing an image showing the calculated projection range on an image showing the space.

While various embodiments have been described above with reference to the drawings, the present invention is, of course, not limited to such examples. It is apparent that those skilled in the art may perceive various modification examples or correction examples within the scope disclosed in the claims, and those examples are also understood as falling in the technical scope of the present invention. In addition, each constituent in the embodiments may be arbitrarily combined without departing from the gist of the invention.

The present application is based on Japanese Patent Application (JP2020-217618) filed on Dec. 25, 2020, the content of which is incorporated in the present application by reference.

EXPLANATION OF REFERENCES

1: projection portion
2: operation reception portion
2A, 3A: hollow portion
2a, 2b, 3a, 3c, 15a: opening
4: control device
4a, 62: memory
6: projection object
10: projection apparatus
10a: first projection apparatus
10b: second projection apparatus
11, 81, 81a, 81b: projection range
11a: first projection range
11b: second projection range
12: light modulation unit
15: housing
21: light source
22: light modulation portion
23: optical projection system
24: control circuit
31: second optical system
32, 122: reflective member
33: third optical system
34: lens
50: installation support apparatus
51: touch panel
61: processor
63: communication interface
64: user interface
65: sensor
69: bus
70: space image
71: space
71a, 71b: wall
71c: ceiling
71d: clock
90: installation support image
91, 91a, 91b: installation range
91c: first installation range
91d: second installation range
101: body part
102: first member
103: second member
104: projection direction changing mechanism
105: shift mechanism
106: optical unit
111, 201: guide information
121: first optical system
121a, 121b: quality information
181, 1001: projection apparatus image
191: projection range
191a: first projection range
191b: second projection range
G1: image

What is claimed is:

1. An installation support apparatus that supports installation of a projection apparatus, the installation support apparatus comprising:
a processor,
wherein the processor is configured to:
based on an input of a projection range of the projection apparatus in a space in which projection is performed by the projection apparatus, calculate an installation range in which the projection apparatus is installable in the space; and
output an installation support image obtained by superimposing an image showing the calculated installation range on an image showing the space.

2. The installation support apparatus according to claim 1, wherein the processor is configured to calculate the installation range based on the projection range and on information indicating a structure of the space.

3. The installation support apparatus according to claim 1, wherein the processor is configured to calculate the installation range based on the projection range and on information indicating specifications of the projection apparatus.

4. The installation support apparatus according to claim 1, wherein the processor is configured to calculate the installation range based on the projection range and on information indicating a non-installation range of the projection apparatus in the space.

5. The installation support apparatus according to claim 1, wherein the processor is configured to calculate the installation range in which projection quality of an image projected to the projection range from the projection apparatus satisfies a reference.

6. The installation support apparatus according to claim 5, wherein the processor is configured to, in a case where the installation range in which the projection quality satisfies the reference is not present, output the installation support image including information that prompts addition or changing of the projection apparatus.

7. The installation support apparatus according claim 1, wherein the processor is configured to:
in a case where an image is projectable to the projection range from the projection apparatus with a plurality of types of projection quality, calculate, for each of the plurality of types of projection quality, the installation range in which the projection apparatus is installable in the space; and output the installation support image obtained by superimposing the image showing the calculated installation range for each of the plurality of types of projection quality on the image showing the space.

8. The installation support apparatus according to claim 1, wherein installation of a first projection apparatus that is the projection apparatus, and of a second projection apparatus different from the first projection apparatus is supported, and the processor is configured to:

based on an input of a projection range of the first projection apparatus in the space, calculate a first installation range in which the first projection apparatus is installable in the space, and a second installation range in which the second projection apparatus is installable in the space; and output the installation support image obtained by superimposing images showing the calculated first installation range and the calculated second installation range on the image showing the space.

9. The installation support apparatus according to claim 1, wherein installation of a first projection apparatus that is the projection apparatus, and of a second projection apparatus different from the first projection apparatus is supported, and the processor is configured to:

based on an input of a projection range obtained by combining a range to which the first projection apparatus performs projection with a range to which the second projection apparatus performs projection in the space, calculate a first installation range in which the first projection apparatus is installable in the space, and a second installation range in which the second projection apparatus is installable in the space; and output the installation support image obtained by superimposing images showing the calculated first installation range and the calculated second installation range on the image showing the space.

10. The installation support apparatus according to claim 1, wherein the processor is configured to, based on attribute information related to visibility of the projection range in the space, output the installation support image obtained by processing a part of the projection range.

11. An installation support method of supporting installation of a projection apparatus, the installation support method comprising:

via a processor, calculating, based on an input of a projection range of the projection apparatus in a space in which projection is performed by the projection apparatus, an installation range in which the projection apparatus is installable in the space; and outputting an installation support image obtained by superimposing an image showing the calculated installation range on an image showing the space.

12. An installation support apparatus that supports installation of a projection apparatus, the installation support apparatus comprising:

a processor, wherein the processor is configured to:

based on inputs of an installation position of the projection apparatus in a space in which projection is performed by the projection apparatus, and projection reference information, calculate a projection range of the projection apparatus in the space, wherein, in the projection range, projection quality of an image projected to the projection range from the projection apparatus satisfies a reference; and output an installation support image obtained by superimposing an image showing the calculated projection range on an image showing the space.

13. The installation support apparatus according to claim 12, wherein the processor is configured to calculate the projection range based on the installation position of the projection apparatus and on information indicating a structure of the space.

14. The installation support apparatus according to claim 12, wherein the processor is configured to calculate the projection range based on the installation position of the projection apparatus and on information indicating specifications of the projection apparatus.

15. The installation support apparatus according to claim 12, wherein the processor is configured to restrict an inputtable installation position of the projection apparatus based on information indicating a non-installation range of the projection apparatus in the space.

16. The installation support apparatus according to claim 12, wherein the processor is configured to, in a case where the projection quality does not satisfy the reference with a designated installation position of the projection apparatus, output the installation support image including information that prompts movement, addition, or changing of the projection apparatus.

17. The installation support apparatus according to claim 12, wherein installation of a first projection apparatus that is the projection apparatus, and of a second projection apparatus different from the first projection apparatus is supported, and the processor is configured to:

based on an installation position of the first projection apparatus in the space and on a designation of a projection reference position, calculate a first projection range to which the first projection apparatus is capable of performing projection in the space, and a second projection range to which the second projection apparatus is capable of performing projection in the space; and output the installation support image obtained by superimposing images showing the calculated first projection range and the calculated second projection range on the image showing the space.

18. The installation support apparatus according to claim 12, wherein the processor is configured to, based on attribute information related to visibility of the projection range in the space, output the installation support image obtained by processing a part of the projection range.

19. An installation support method of supporting installation of a projection apparatus, the installation support method comprising:

via a processor, calculating, based on inputs of an installation position of the projection apparatus in a space in which projection is performed by the projection apparatus, and projection reference information, a projection range of the projection apparatus in the space, wherein, in the projection range, projection quality of an image projected to the projection range from the projection apparatus satisfies a reference; and outputting an installation support image obtained by superimposing an image showing the calculated projection range on an image showing the space.

* * * * *